(12) United States Patent
Clark et al.

(10) Patent No.: US 7,937,724 B2
(45) Date of Patent: May 3, 2011

(54) ADVERTISING CONTENT TRACKING FOR AN ENTERTAINMENT DEVICE

(75) Inventors: Darren L. Clark, Oakland, CA (US); Howard L. Spielman, San Francisco, CA (US); Chris D. Scott, Novato, CA (US); David S. Schmidt, San Francisco, CA (US)

(73) Assignee: e-cast Inc., San Francisco, CA (US)

( * ) Notice: Subject to any disclaimer, the term of this patent is extended or adjusted under 35 U.S.C. 154(b) by 749 days.

(21) Appl. No.: 11/261,292

(22) Filed: Oct. 27, 2005

(65) Prior Publication Data

US 2007/0101365 A1    May 3, 2007

(51) Int. Cl.
*H04N 7/10* (2006.01)
*H04N 7/025* (2006.01)

(52) U.S. Cl. .......... 725/35; 725/9; 725/10; 725/13; 725/32; 725/34; 705/14.1

(58) Field of Classification Search .......... 725/32–36, 725/9, 16, 20, 100, 139, 151; 705/14
See application file for complete search history.

(56) References Cited

U.S. PATENT DOCUMENTS

| | | | |
|---|---|---|---|
| 5,949,411 A | 9/1999 | Doerr et al. | |
| 6,183,366 B1 | 2/2001 | Goldberg et al. | |
| 6,286,029 B1 | 9/2001 | Delph | |
| 6,393,407 B1 | 5/2002 | Middleton et al. | |
| 6,446,130 B1 | 9/2002 | Grapes | |
| 6,530,082 B1 * | 3/2003 | Del Sesto et al. | 725/9 |
| 6,766,524 B1 * | 7/2004 | Matheny et al. | 725/23 |
| 6,812,851 B1 | 11/2004 | Dukach et al. | |
| 6,846,238 B2 | 1/2005 | Wells et al. | |
| 6,942,574 B1 | 9/2005 | LeMay et al. | |
| 6,983,478 B1 | 1/2006 | Grauch et al. | |
| 2001/0032121 A1 | 10/2001 | Le | |
| 2001/0034643 A1 | 10/2001 | Acres | |
| 2002/0059094 A1 | 5/2002 | Hosea et al. | |

(Continued)

FOREIGN PATENT DOCUMENTS

| | | |
|---|---|---|
| WO | WO 01/08148 | 2/2001 |
| WO | WO 01/09789 A1 | 2/2001 |
| WO | WO 01/32279 A1 | 5/2001 |

OTHER PUBLICATIONS

Gluck, Marissa et al., "The Evolution of Rich Media Advertising: Current Market Trends, Success Metrics and Best Practices," 2005 DoubleClick Inc., Sep. 2005, pp. 1-17.

(Continued)

*Primary Examiner* — Joseph P Hirl
*Assistant Examiner* — Joshua Taylor
(74) *Attorney, Agent, or Firm* — Van Pelt, Yi & James LLP

(57) ABSTRACT

Systems and methods of processing data from a plurality of entertainment devices are provided. The method may include: receiving user interaction information, said user interaction information comprising information regarding user interaction with an advertisement displayed on an entertainment device, said entertainment device being configured to perform entertainment content; and associating the user interaction information with venue information regarding a venue in which the entertainment device is located. The system may include: an entertainment device database including information regarding a plurality of entertainment devices configured to perform entertainment content; a storage system storing user interaction information received from the plurality of entertainment devices, said user interaction information comprising information regarding user interaction with an advertisement displayed on an entertainment device; and a processor configured to associate the user interaction information for one of the plurality of entertainment devices with venue information regarding a venue in which the one of the plurality of entertainment devices is located.

58 Claims, 10 Drawing Sheets

U.S. PATENT DOCUMENTS

| | | | |
|---|---|---|---|
| 2002/0098891 A1 | 7/2002 | Graham et al. | |
| 2002/0178225 A1 | 11/2002 | Madenberg et al. | |
| 2002/0188508 A1 | 12/2002 | Lee et al. | |
| 2004/0005926 A1 | 1/2004 | LeFroy | |
| 2004/0025174 A1* | 2/2004 | Cerrato | 725/9 |
| 2004/0059625 A1 | 3/2004 | Schrader et al. | |
| 2005/0022126 A1 | 1/2005 | Hatscher et al. | |
| 2005/0096978 A1* | 5/2005 | Black | 705/14 |
| 2005/0149396 A1 | 7/2005 | Horowitz et al. | |
| 2005/0216348 A1 | 9/2005 | Martin et al. | |
| 2006/0122896 A1 | 6/2006 | Parsley | |
| 2006/0195356 A1* | 8/2006 | Nerenhausen et al. | 705/14 |
| 2007/0022005 A1 | 1/2007 | Hanna | |

OTHER PUBLICATIONS

Oser, Kris, "Stolichnaya Promotion Uses Barroom Jukeboxes," Advertising Age, Sep. 5, 2005, 1 page.

Koegel, Kathryn, "Rich Media: What? Where? Why?," DoubleClick Inc., Jul. 2003, pp. 1-17.

Schmitz, Ellyn, "Compaign Management Tools: A Primer," Direct, pp. 1-3, last visited Feb. 1, 2006, http://222.printthis.clickability.com/pt/cpt?action-cpt&title=Campai....

International Search Report, PCT/US06/042093, mailing date Mar. 22, 2007.

Written Opinion of the International Searching Authority, PCT/US06/042093.

\* cited by examiner

ADVERTISING CONTENT TRACKING FOR AN ENTERTAINMENT DEVICE

BACKGROUND

Traditional entertainment devices for out-of-home use, for example in restaurants or bars, are typified by the jukebox that plays selected vinyl records or compact discs after the insertion of coins or paper currency.

More recently, entertainment devices for public venues have begun to provide additional forms of entertainment beyond merely playing music from compact discs. Some entertainment devices are provided with personal computer architecture and are equipped with hard drives capable of storing huge libraries of music, video, and games. Patrons of the venue may operate the entertainment device to provide the desired service, such as to play a selected song or display a selected music video.

These entertainment devices may include displays for providing information regarding entertainment content currently being performed. For example, in CD-based jukeboxes, a CD identification number and track number for the currently playing song may be displayed on a digital LED display. More contemporary jukeboxes have been provided with video monitors that are capable of displaying complex text and graphics. These displays can present a graphical user interface for enabling user to browse the song catalog, enter music selections, and view detailed information regarding the current song, artist, and album being performed.

Commercial advertising has been integrated into other forms of entertainment media, such as television programming and broadcast radio. On the Internet, web sites commonly include banner advertisements, which typically are displayed as boxes containing text, graphics, and/or animation. These boxes may serve as hypertext links such that when a user clicks on the box, the user is brought to a web page providing additional information regarding the product or service promoted in the advertisement.

With the ability for modern jukeboxes to retrieve digital files over the Internet and display graphics on a video screen, it would be desirable to provide commercial advertisements on venue-based entertainment devices.

SUMMARY

Systems and methods are provided to allow advertisers to more effectively reach users of entertainment devices. Through a combination of static and interactive content, advertisements can be presented that reinforce advertisers' brands, as well as offering consumers the opportunity to interact with their branded content. The nature of such interactive content may simply engage and entertain the user while they interact with it, or the advertisement may also capture personal and/or demographic data, as well as rewarding the users for their interaction. Following the display of advertising content, data that measures the number of times each advertisement was displayed, as well as captures any specific data entered by users in response to the advertisement may be collected and reported to a central host system. The host system may then associate the collected data with information regarding the venue in which the entertainment device is located in order to provide the advertisers with additional useful information regarding the success of the advertising campaign.

Some of the screens that make up the user interface of the consumer applications on the entertainment device dedicate a portion of their space for advertising content. The advertising content, when displayed in the context of the user interface, may appear to users as buttons, "tower" advertisements, or "banner" advertisements. Each of these advertising elements may be passive or interactive. If interactive, the user may touch, click, or otherwise select the area of the screen where the advertisement is displayed to cause some action to take place, or some other content to be displayed. Non-interactive, passive advertising content simply displays information, which may even include animation, but does not react to user actions.

Systems and methods are provided for activating advertisements on entertainment devices across a network. The advertisements may be activated on each entertainment device in the network based on certain conditions defined by the host system. The changing of the devices targeted by an advertising campaign may be accomplished by changing centrally managed configuration values. In some embodiments, the advertising content (which may be very large) and the display instructions are distributed to all devices on the network. As a result, significant changes may be made very quickly and easily to target the advertising campaign to additional or to a different set of devices. In other embodiments, the content may be acquired as needed.

In accordance with embodiments of the present invention, a method of processing data from a plurality of entertainment devices is provided, comprising: receiving user interaction information, said user interaction information comprising information regarding user interaction with an advertisement displayed on an entertainment device, said entertainment device being configured to perform entertainment content; and associating the user interaction information with venue information regarding a venue in which the entertainment device is located.

In accordance with other embodiments of the present invention, a system for processing data from a plurality of entertainment devices is provided, comprising: an entertainment device database including information regarding a plurality of entertainment devices configured to perform entertainment content; a storage system storing user interaction information received from the plurality of entertainment devices, said user interaction information comprising information regarding user interaction with an advertisement displayed on an entertainment device; and a processor configured to associate the user interaction information for one of the plurality of entertainment devices with venue information regarding a venue in which the one of the plurality of entertainment devices is located.

In accordance with other embodiments of the present invention, a method of processing data from a plurality of entertainment devices is provided, comprising: receiving advertisement performance information regarding display of advertising content on each of the plurality of entertainment devices, each entertainment device being configured to perform entertainment content upon request from users; and associating the advertisement performance information with venue information regarding a venue in which the entertainment device is located.

In accordance with other embodiments of the present invention, a system for processing data from a plurality of entertainment devices is provided, comprising: an entertainment device database including information regarding a plurality of entertainment devices configured to perform entertainment content upon request from users; a storage system storing advertisement performance information received from the plurality of entertainment devices; and a processor configured to associate the advertisement performance information for one of the plurality of entertainment devices with venue information regarding a venue in which the one of the plurality of entertainment devices is located.

In accordance with other embodiments of the present invention, a method of processing data from a plurality of entertainment devices is provided, comprising: receiving user interaction information, said user interaction information comprising information regarding user interaction with an advertisement displayed on an entertainment device, said entertainment device being configured to perform entertainment content; and associating the user interaction information with venue information regarding a performance history of the entertainment device.

In accordance with other embodiments of the present invention, a system for processing data from a plurality of entertainment devices is provided, comprising: an entertainment device database including information regarding a plurality of entertainment devices configured to perform entertainment content; a storage system storing user interaction information received from the plurality of entertainment devices, said user interaction information comprising information regarding user interaction with an advertisement displayed on an entertainment device; and a processor configured to associate the user interaction information for one of the plurality of entertainment devices with venue information regarding a performance history of the one of the plurality of entertainment devices.

In accordance with other embodiments of the present invention, a method of processing data from a plurality of entertainment devices is provided, comprising: receiving advertisement performance information regarding display of advertising content on each of the plurality of entertainment devices, each entertainment device being configured to perform entertainment content upon request from users; and associating the advertisement performance information with venue information regarding a performance history of the entertainment device.

In accordance with other embodiments of the present invention, a system for processing data from a plurality of entertainment devices is provided, comprising: an entertainment device database including information regarding a plurality of entertainment devices configured to perform entertainment content upon request from users; a storage system storing advertisement performance information received from the plurality of entertainment devices; and a processor configured to associate the advertisement performance information for one of the plurality of entertainment devices with venue information regarding a performance history of the entertainment device.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
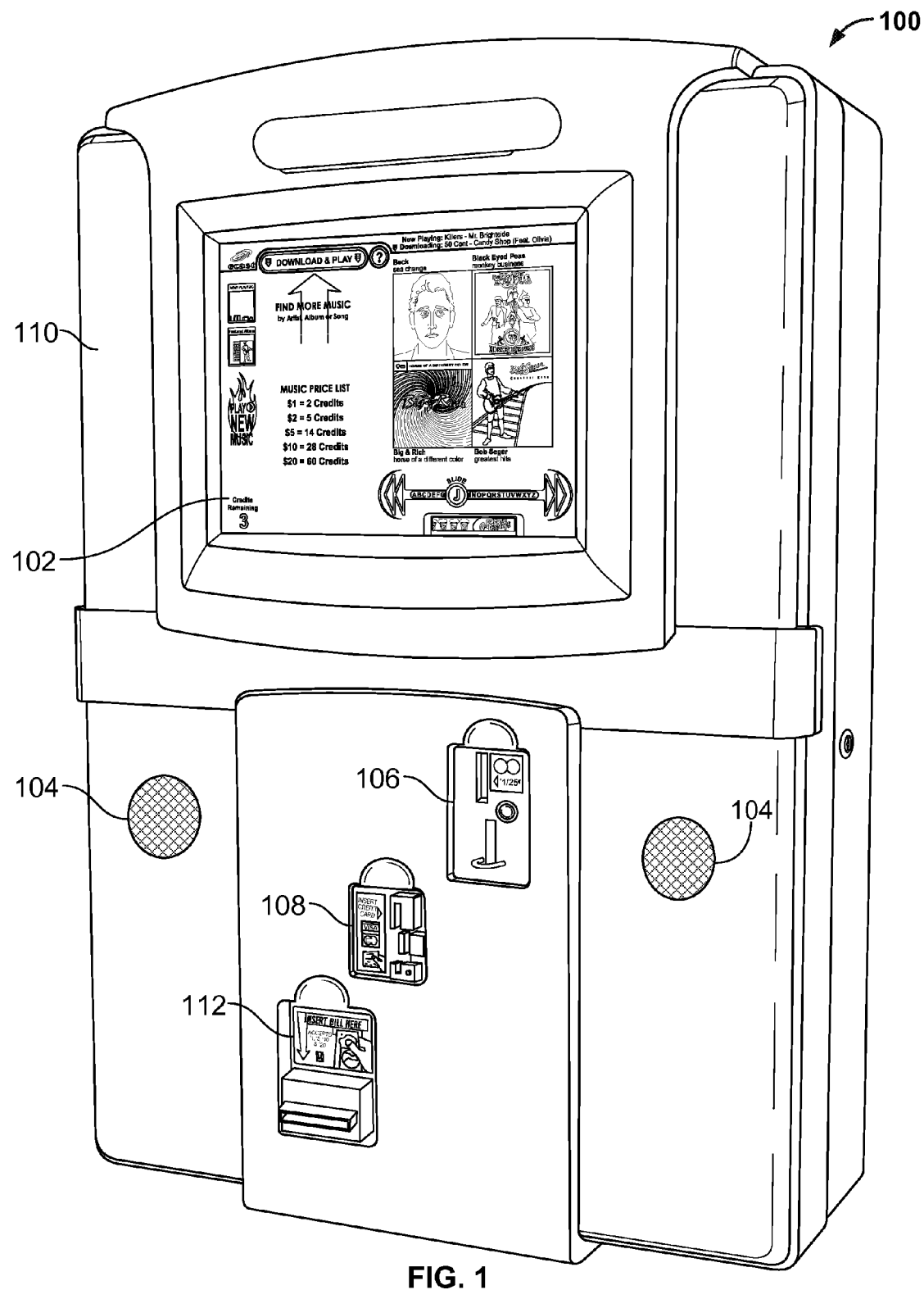
FIG. 1 shows a simplified block diagram of an exemplary entertainment device, in accordance with embodiments of the present invention.

FIG. 1 is a perspective view of an exemplary entertainment device 100, in accordance with embodiments of the present invention. This entertainment device 100 comprises a housing 110 including an opening for a touch-screen video display 102. The entertainment device 100 also includes at least one audio speaker 104 and optionally a payment interface. In the illustrated embodiment, the payment interface comprises a cash payment collector and a non-cash payment collector. The cash payment collector comprises a coin collector 106 and a bill collector 112 for receiving cash payments from users in the form of coins, tokens, or bills. The non-cash payment collector comprises a card reader 108 for accepting payments from users using a credit card, debit card, smart card, magnetic strip token card, or other non-cash forms of payment.

In other embodiments, one or more of the payment collectors 106, 108, 112 may be omitted and/or other types of payment collectors may be added. For example, in some embodiments, the entertainment device may offer free selection of content to consumers, with payment made via a periodic lease, license, or subscription fee for the device, e.g., paid by the venue proprietor. In other embodiments, a user may log into the entertainment device 100 using a User ID. This User ID may be associated with prepaid credits or with a credit card for automatic debits in exchange for performance of entertainment content on the entertainment device 100.

The entertainment device 100 may also include audio and/or video outputs for transmitting audio and/or video signals for performance by external devices, such as loudspeakers and video displays provided elsewhere in the venue, to replace or supplement the speakers 104.

Figure 2:
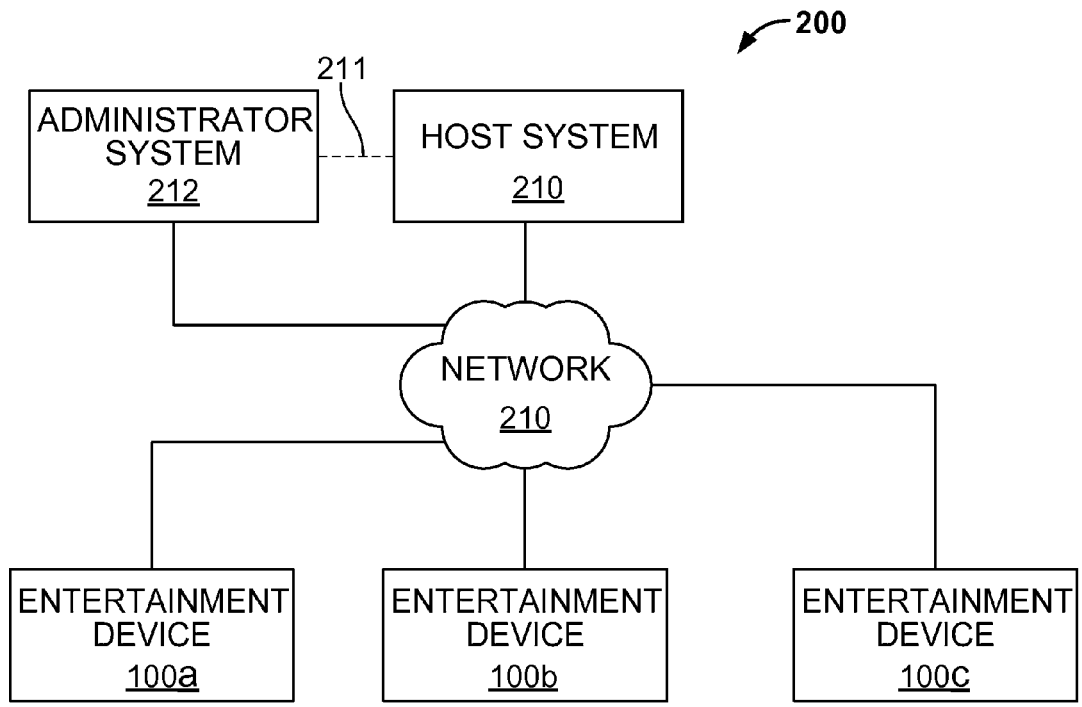
FIG. 2 is a simplified block diagram of an entertainment network, in accordance with embodiments of the present invention.

FIG. 2 shows a simplified block diagram of an entertainment network 200, in accordance with embodiments of the present invention. The network 200 comprises a host system 210 coupled to a plurality of entertainment devices 100a-100c over a network 210. The network 210 may comprise, e.g., a wide-area network (WAN), such as the Internet. The host system 210 and the entertainment devices 100 may connect to the network 210 via various mechanisms, as would be understood by those of ordinary skill in the art. For example, the systems may have broadband connections to the Internet, and may be continuously or intermittently coupled to the network 210. Each of the entertainment devices 100 may be located in a public venue, such as a bar, restaurant, or arcade.

Figure 3:
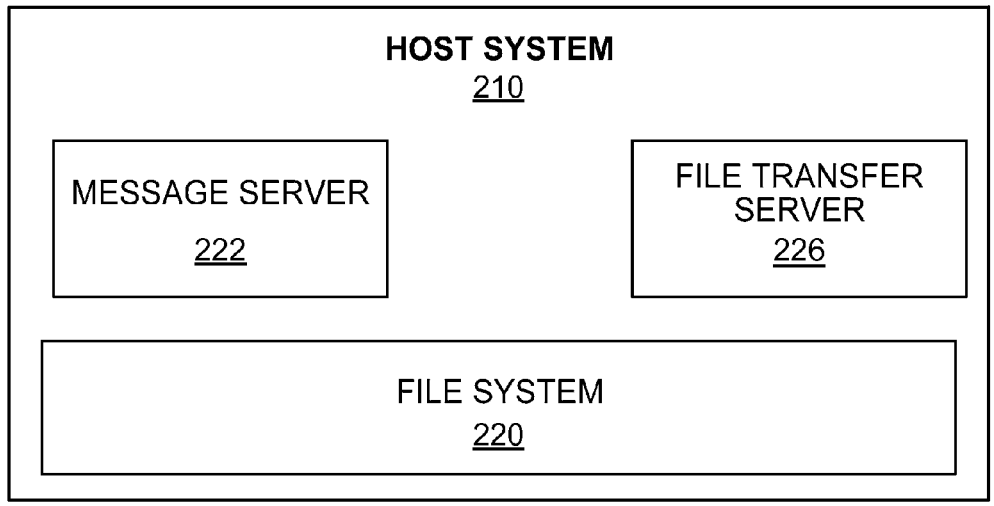
FIG. 3 shows a simplified block diagram of a host system, in accordance with embodiments of the present invention.

The host system 210 may comprise a central management system for controlling the various entertainment devices 100 and for distributing entertainment and advertising content, such as music, video, graphics, interactive surveys and quizzes, or text files, and operational content, such as software updates, to those devices 100. This host system 210 may take various forms, one example of which is shown in FIG. 3. The host system 210 shown in FIG. 3 comprises multiple components which may be implemented on a single server or across multiple servers. The illustrated host system 210 is a simplified block diagram of an exemplary host system with various components omitted for clarity, and in other embodiments, the host system 210 may be configured differently. As shown, the host system 210 comprises one or more message servers 222 which can transmit and receive messages to and from the entertainment devices 100 coupled to the network 210.

A file system 220 is provided for storing various files that may be downloaded by the entertainment devices 110. The file system 220 may comprise, e.g., a storage subsystem containing operational files, such as, e.g., software patches, executable programs, graphic files for use in the entertainment device's user interface, configuration setting files, or other files that may be used to control the operation of the entertainment device 110. The file system 220 may further contain advertising and entertainment content files such as, e.g., digital audio files, multimedia files, text files, game files, and other files that may be performed for or used by consumers at the venue location. The file system 220 may further store metadata associated with the entertainment content, such as, e.g., title, artist, and album information corresponding to each musical song file. One or more file transfer servers 226 may be provided for managing the transfer of files from the file system 220 to the various entertainment devices 100. Each of the files stored in the file system 220 may be associated with a unique Content ID to enable entertainment devices 100 to easily identify and retrieve files from the file system 220.

The operation of a similar entertainment network is described in U.S. patent application Ser. No. 10/956,823, entitled "Prioritized Content Download for an Entertainment Device," filed on Oct. 1, 2004, the contents of which are incorporated by reference herein in its entirety.

An administrator may manage the host system 210 directly or may use a separate administrator system 212 to interface with and control the host system 210. The administrator system 212 may comprise a separate computer system couplable to the host system 210 via a wide-area network (WAN), such as the network 210, or via a local-area network (LAN) 211.

The entertainment device 100 may comprise any of a variety of network-enabled entertainment devices, such as, e.g., freestanding jukeboxes, wall mounted jukeboxes, countertop units, and dedicated gaming units. These entertainment devices 100 may provide users with entertainment content in various forms, such as, e.g., audio, video, graphics, video games, software, text, and combinations thereof.

Figure 4:
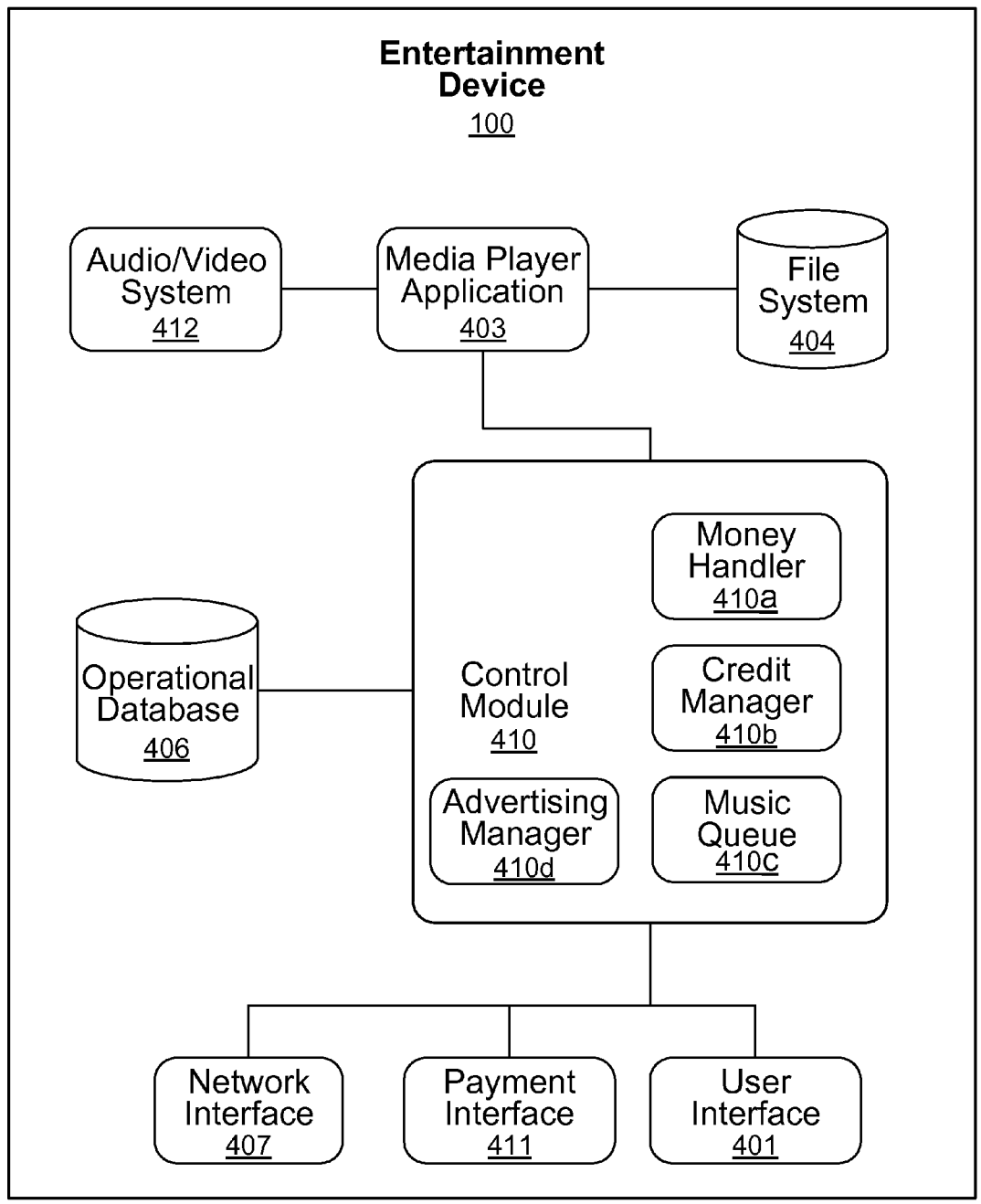
FIG. 4 shows a simplified block diagram of an entertainment device, in accordance with embodiments of the present invention.

FIG. 4 is a simplified block diagram of an exemplary jukebox-type entertainment device 100. The entertainment device 100 may take various forms, but in the illustrated embodiment comprises a jukebox having a user interface 401, which may comprise a user input device enabling a user at the venue where the entertainment device 100 is located to input commands into the entertainment device 100. The user interface 401 may comprise, e.g., a keyboard, a touchpad, a mouse, a touch screen, or other input device, as would be understood by those of ordinary skill in the art. In the embodiment illustrated in FIG. 1, the user input device comprises a touch-screen display 102.

The entertainment device 100 also comprises an audio/video system 412, which enables the entertainment device 100 to perform entertainment content, e.g., in response to user requests, on a periodic basis (such as every ten minutes if there are no user requests pending), or according to a predetermined schedule. The audio/video system 412 may comprise an amplifier and audio speakers (e.g., speakers 104) for playing music and a monitor (e.g., display 102) for displaying video images. In other embodiments, the audio/video system 412 may couple to an amplifier and/or speakers located elsewhere in the venue 402 external to the entertainment device 100. A media player application 403 (such as, e.g. the Windows Media Player by the Microsoft Corporation of Seattle, Wash.) is provided for causing the audio/video system 412 to perform the requested entertainment content. For example, when the requested entertainment content comprises a song, the media player application 403 will retrieve from the file system 404 the digital file containing audio data (e.g., encoded using WMA or MP3 compression algorithms) corresponding to the requested song. The media player application 403 will process the digital file to produce an analog audio signal that can be played over loudspeakers located either within the entertainment device 100 or elsewhere in the venue.

A payment interface 411 may be provided for receiving the payment from customers in exchange for providing the entertainment services. As shown in FIG. 1, the payment is received as cash payment in the coin collector 106 or the bill collector 112, or as non-cash payment into the card reader 108. When non-cash payment is received, the payment interface 411 may retrieve payment authorization from the financial services provider associated with that debit or credit card, a smart card reader, any combination of the above, or any other payment receiving mechanism.

A network interface 407 provides an interface between the entertainment device 100 and the network 210 and may comprise, e.g., an RJ-11 port, a wireless adapter, or a modem. An operational database 406 for storing various configuration setting values and information about the entertainment content is also provided. Finally, a control module 410 is provided for managing the various functions of the entertainment device 100. The control module 410 may comprise multiple modules for managing the various features of the entertainment device 100. These modules may include, for example, a money handler 410a for managing monetary payment from customers, a credit manager 410b for managing the consumption of credits, a content performance queue 410c for managing the performance of entertainment content selected by users, and an advertising manager 410d for managing advertising content provided by the entertainment device 100, as will be described in greater detail below. The entertainment device 100 may be implemented using, for example, standard personal computer hardware and architecture.

The embodiment shown in FIG. 4 can operate as follows. The entertainment device 100 includes a local file system 404 storing a plurality of different entertainment content files available to customers. These customers can utilize the user interface 401 and payment interface 411 to select and pay for the performance of entertainment content. The customer may pay for the performance by inserting cash into one of the cash payment collectors. If the customer attempts to pay for the performance using, e.g., a credit card or ATM card, the entertainment device 100 can connect to a payment authorization server on the network 210 in order to authorize the payment. In some embodiments, the customer need not pay for the performance of entertainment content. This service may be paid for by the venue proprietor, or may be paid for through advertising campaigns displayed by the entertainment device 100, as will be described in more detail below. The control module 410 maintains a queue of requested entertainment content and will instruct the media player application 403 to play each requested entertainment content in turn from the queue or according to some other prioritization scheme.

The control module 410 may also store a history of events that take place on the entertainment device 100. These events can include, e.g., entertainment content performed, revenue collected, and advertising events. For example, each time a song is played, that performance is recorded. The total performances of songs (and/or other types of entertainment content) by the entertainment device 100 is reported to the host system 210. This reporting may be required in order to satisfy royalty and/or licensing requirements for the entertainment content. The amount of revenue collected may be stored and reported back to the host system 210 so that the actual cash collections may be compared to the reported collections.

In order to communicate the event history from the entertainment device 100 to the host system 210, the control module 410 may transmit a message to the message server 222 of the host system 210 via the network 210 containing information regarding the events. This message may comprise, e.g., an XML message, and may include information such as, e.g., a Location ID uniquely identifying the venue where the content was performed, a Device ID uniquely identifying the device or disk drive that was used, the local time of the performance at the location, a Content ID uniquely identifying the performed entertainment content, an indication of whether the entertainment content was performed by request or by automatic playback, and the price paid for the performance. These messages may be sent each time an event occurs (e.g., each time an entertainment content item is requested or performed), or may be sent periodically including information regarding a plurality of events. The host system 210 receives the message from the entertainment device 100 and stores the historical performance records. The host system 210 can then retrieve aggregate performance data regarding all of the entertainment devices 100 on the network and specific performance data on the entertainment content being requested at each device 100.

The control module 410 may periodically contact the message server 222 of the host system 210 to request a manifest of files that the entertainment device 100 should have locally stored in order to possess a full complement of software and other files. This manifest may be delivered from the host system 210 to the entertainment device 100 as an XML document. If any files listed in the manifest are new or modified since the last time the control module 410 loaded its software, a content manager component of the control module 410 may request those files from the host system 210 in a process similar to the acquisition of new entertainment content. Once all of the files identified by the manifest have been acquired, at a predetermined time (or within a predetermined window of time), the files will be applied and the entertainment device 100 will reboot. The files listed on the manifest may include music catalogs, attract loops, and advertising content.

As described above, the operational database 406 may store various configuration settings for controlling the operation of the entertainment device 100. Each configuration value stored in the operational database 406 may both centrally manageable (e.g., from the host system 210) or locally manageable (e.g., by an administrator interacting with the GUI interface of the entertainment device 100).

Rich Media Advertisements

In accordance with embodiments of the present invention, the user interface of the entertainment device may operate in various modes: selection mode, advertising mode, attract mode, and hybrid mode.

In selection mode, the display 102 provides a graphical user interface to enable users to browse and/or search for entertainment content and to select an entertainment content item for performance on the entertainment device 100. The browsing interface may be configured to allow users to scroll through lists of albums by genre, popularity, release date, etc. The searching interface may be configured to allow users to search for entertainment content by entering text corresponding to a song title, an album title, and/or an artist name. In some embodiments, the selection mode may be configured to allow users to browse and/or search for entertainment content locally stored in the file system 404 of the entertainment device 100 and entertainment content remotely stored and available for retrieval from the host system 210.

In advertising mode, the entertainment device 100 utilizes the display 102 and/or the audio system for commercial advertising purposes. The entertainment device 100 may provide commercial advertisements by displaying static images or rich media advertisements. Rich media advertisements are graphical advertisements enhanced by motion, sound, video, and/or an interactive element. The rich media advertisements may utilize video, audio, vector graphics (e.g., the Flash programming platform by Macromedia), DHTML, Shockwave, and Java, and may integrate video and/or audio with interactivity.

In attract mode, the entertainment device 100 displays text, graphics, and/or video in order to entice the customers in the venue to interact with the entertainment device 100. For example, when no users are currently interacting with the entertainment device 100, the display 102 may display a cover image from a newly-released album available for performance on the entertainment device 100, a photograph of the artist, and/or a music video for that album. Audio in the form of sample music and/or speech may also be performed by the entertainment device 100 during the attract loop mode.

In hybrid mode, one or more regions of the display 102 are utilized for a first mode of operation and one or more regions of the display 102 are utilized for a second mode of operation. For example, the screen may comprise a content selection region including a GUI for browsing and/or selecting entertainment content items to perform, and an advertising region for displaying rich media advertisements.

In some embodiments, the graphical user interface may switch between different modes during normal operation. The switching between modes may occur according to a predetermined sequence or in response to the user's selection.

For example, a user searching for entertainment content in the selection mode may view a New Releases screen showing a list of newly-released albums. When the user selects an album from the list, the GUI will transition to a new screen showing the tracks and an image of the cover art from that album. In some embodiments, an advertising screen may be displayed between the transition from the New Releases screen to the album screen according to a predetermined sequence. This transitional advertising screen may be referred to as an interstitial. This advertising screen may be shown for a short period of time or until the user selects a "CONTINUE WITH MUSIC SELECTION" button.

In other embodiments, an action by the user may initiate the switch from one mode to another. For example, the GUI may be operating in hybrid mode in which a first region of the screen is utilized for selection mode and a second region of the screen is utilized for advertising mode. If the user touches the advertising region of the touch-screen display, the GUI may transition to dedicated advertising mode in which the entire screen is utilized for advertising purposes.

Figure 5A:
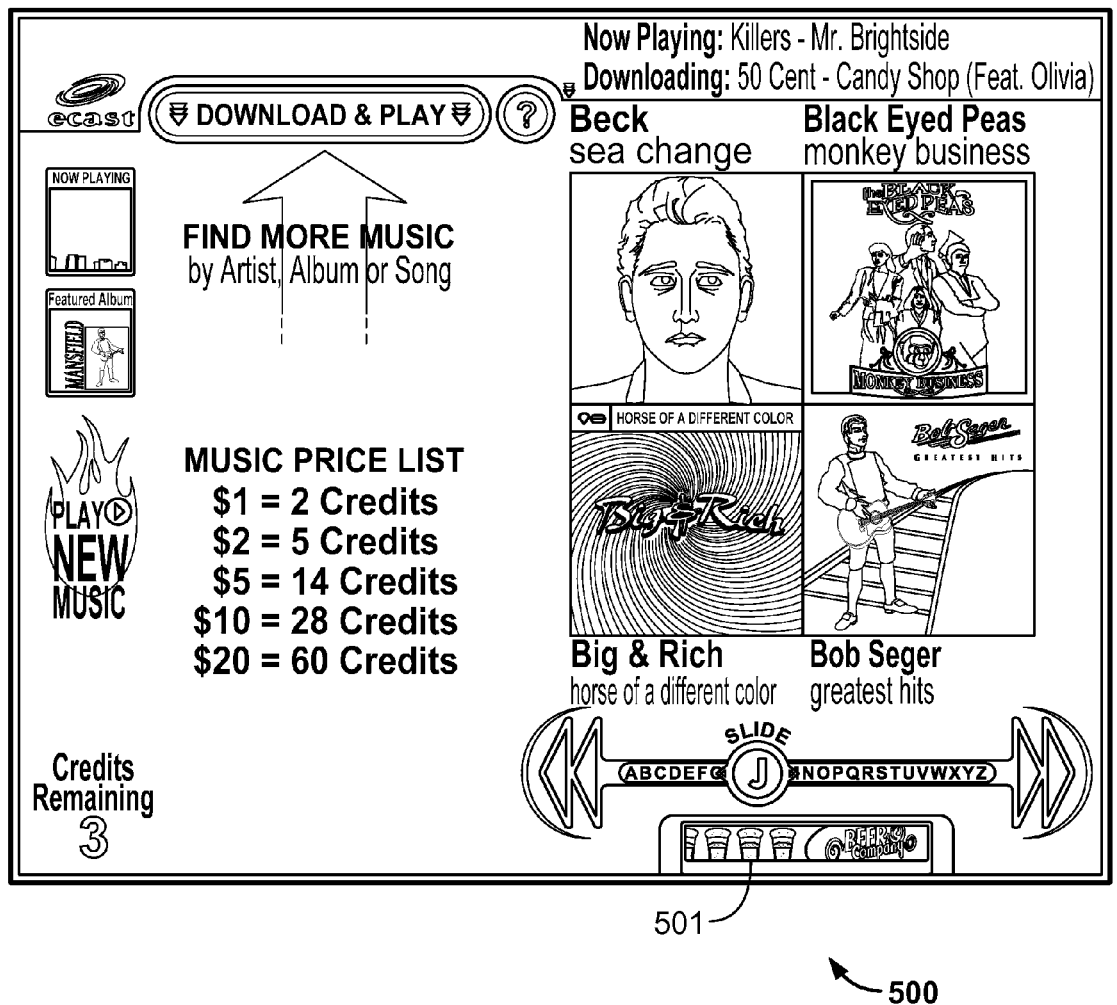
FIGS. 5A-5D illustrate a series of user interface screens, in accordance with embodiments of the present invention.

FIGS. 5A-5D illustrate a series of user interface screens, in accordance with embodiments of the present invention. FIG. 5A shows a screen 501 comprising a main screen for browsing local albums. Screen 500 shows a hybrid mode screen in which the majority of the screen is utilized for selection mode operation, while a small region 501 is utilized for advertising. This region 501 may comprise, e.g., a static advertising image or a rich media image, and may serve as a selectable link to a new screen with additional detail regarding the advertised product or service.

Figure 5B:
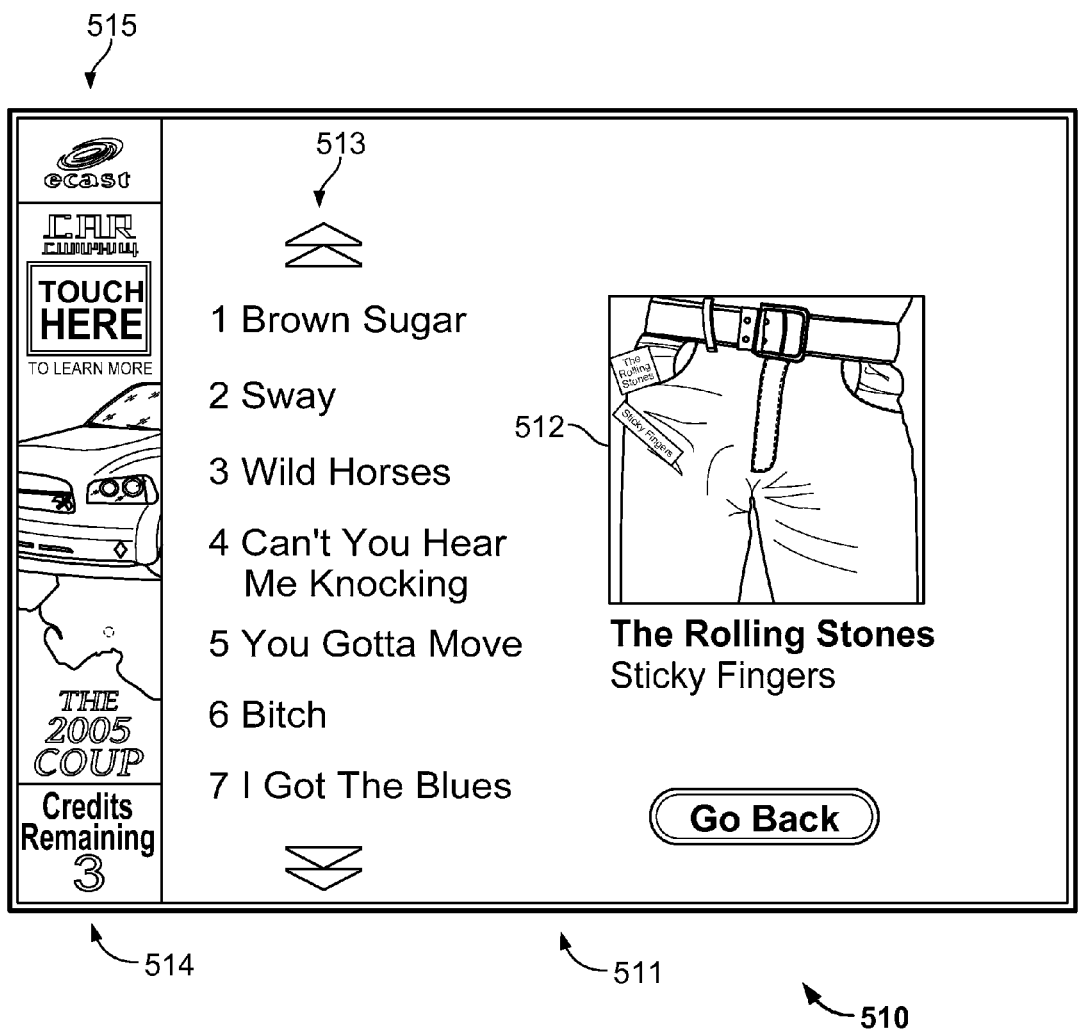

FIG. 5B shows a hybrid mode screen 510 in which a first content selection region 511 of the screen 510 is utilized for selection mode operation and a second advertising region 515 is utilized for advertising mode operation. The first region 511 includes a cover image 512 of the album being viewed, a scrollable list 513 of song tracks from that album, and a credit indicator 514 showing the user how many credits remain. The second region 515 comprises a tower advertisement.

If the user selects this advertisement (e.g., by touching the portion of the screen corresponding to the second region 515), the GUI may provide additional information regarding the advertised product or service. The GUI may provide this additional information in a variety of ways. For example, the advertisement may expand to consume a larger portion of the screen (up to the entire screen) in order to display the additional information. Alternatively, a floating advertisement may be generated. This floating advertisement may be displayed over the first region 511 and may be semi-translucent such that the first region 511 remains at least partially visible through the overlaid floating advertisement. The expanded or floating advertisements may comprise a single screen containing advertising content (including, e.g., graphics, audio, and/or video), or may comprise a series of screens containing an extended advertising segment, as will be described in greater detail below.

Figure 5C:
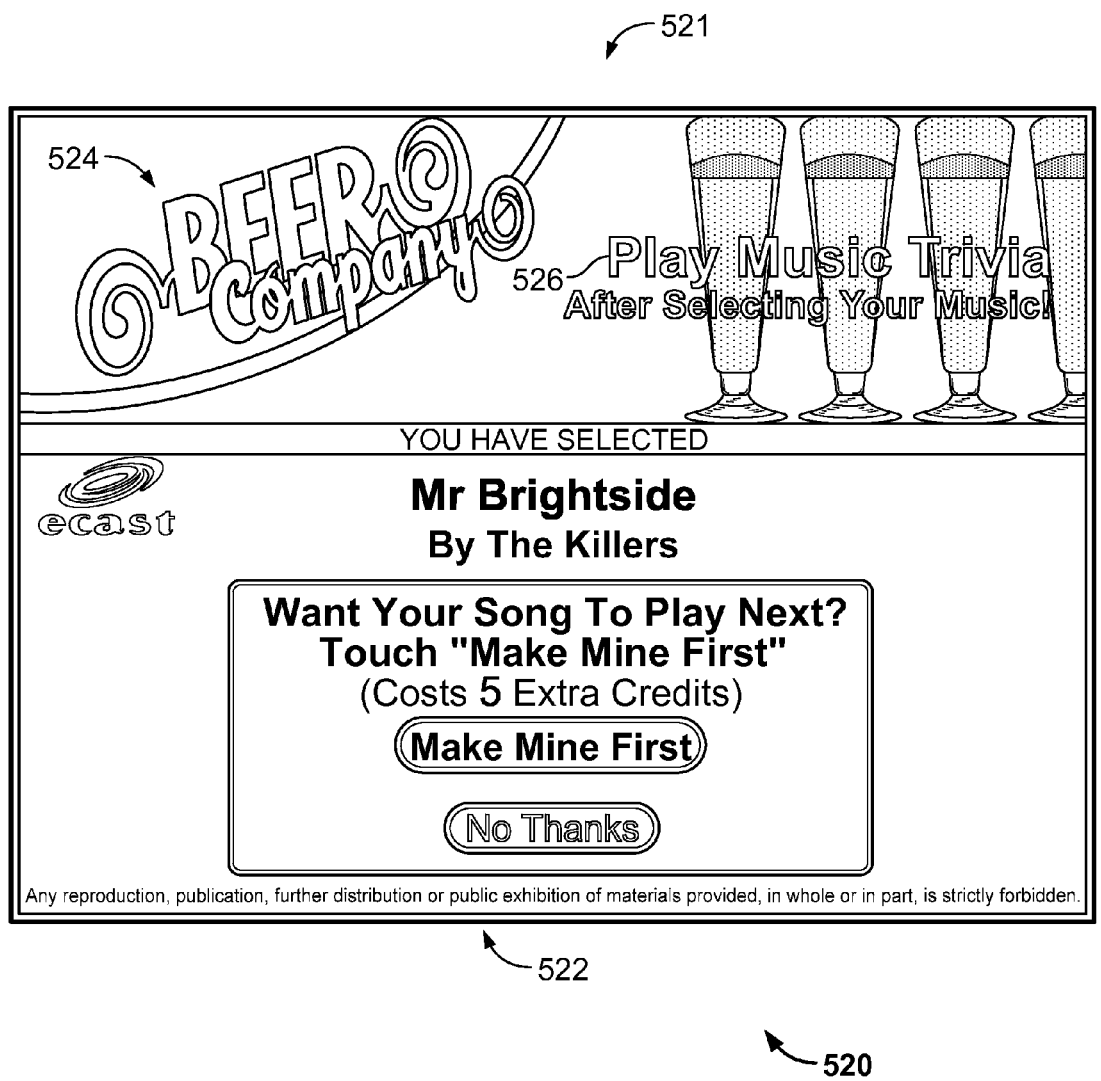

FIG. 5C shows another hybrid mode screen 520. In this case, the screen 520 is divided along a horizontal line, with an upper advertising region 521 being utilized for advertising mode operation, and a lower content selection region 522 utilized for selection mode operation. Here, the user has already selected the song to be performed and in the lower region 522 is being provided with the option of spending additional credits to have that song moved up in the queue of songs already selected for performance.

The advertising region 521 displays a commercial advertisement for a product and includes a graphical image 524 and a control input 526. This control input 526 may take the form of, e.g., a selectable (e.g., touchable or clickable) link or button. In response to the selection of the control input 526 by the user, the entertainment device 100 will invoke an extended advertising segment which may provide additional information regarding the product being advertised.

Figure 5D:
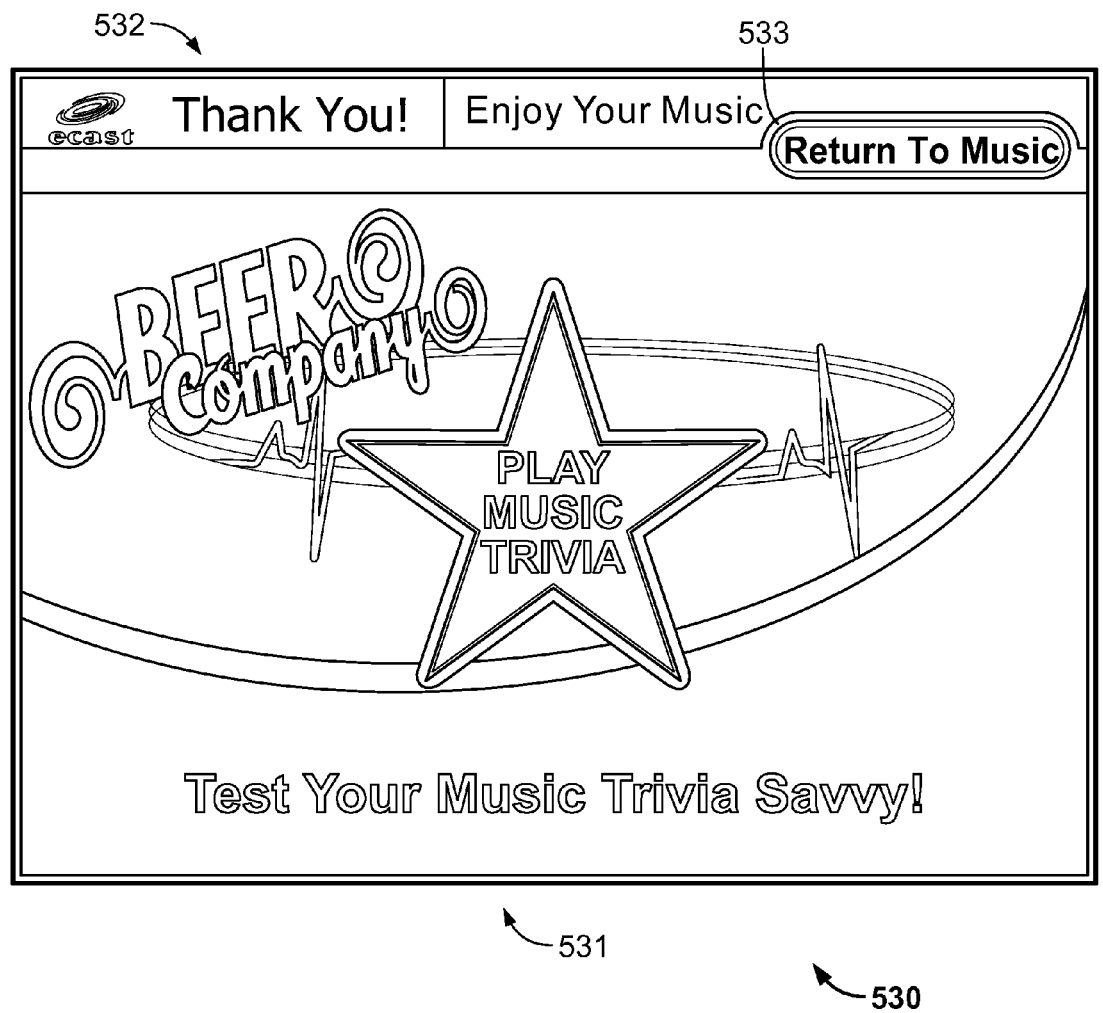

If the user does not select the control input 526 in the advertising region 521, the user may continue browsing for additional entertainment content until all of the user's credits have been consumed. After the user's credits have been consumed, the GUI may display a hybrid mode screen 530, as shown in FIG. 5D. Here, the smaller upper region 532 is utilized for selection mode operation and the larger lower region 531 is utilized for advertising mode operation. In the upper region 532, the screen displays a message thanking the user for the purchased entertainment content and includes a control input 533, which when selected returns the user to the main menu for the entertainment device 100.

The lower region 531, which occupies approximately 90% of the display area of the screen, is utilized for displaying an advertisement. In this screen, the entire lower region 531 may serve as a control input such that if the user touches the screen anywhere within the lower region 531, the user will invoke an extended advertising segment. Alternatively, the lower region 531 may include a clickable link or button for invoking the extended advertising segment.

Extended Advertising and Interactivity Rewards

Figure 6A:
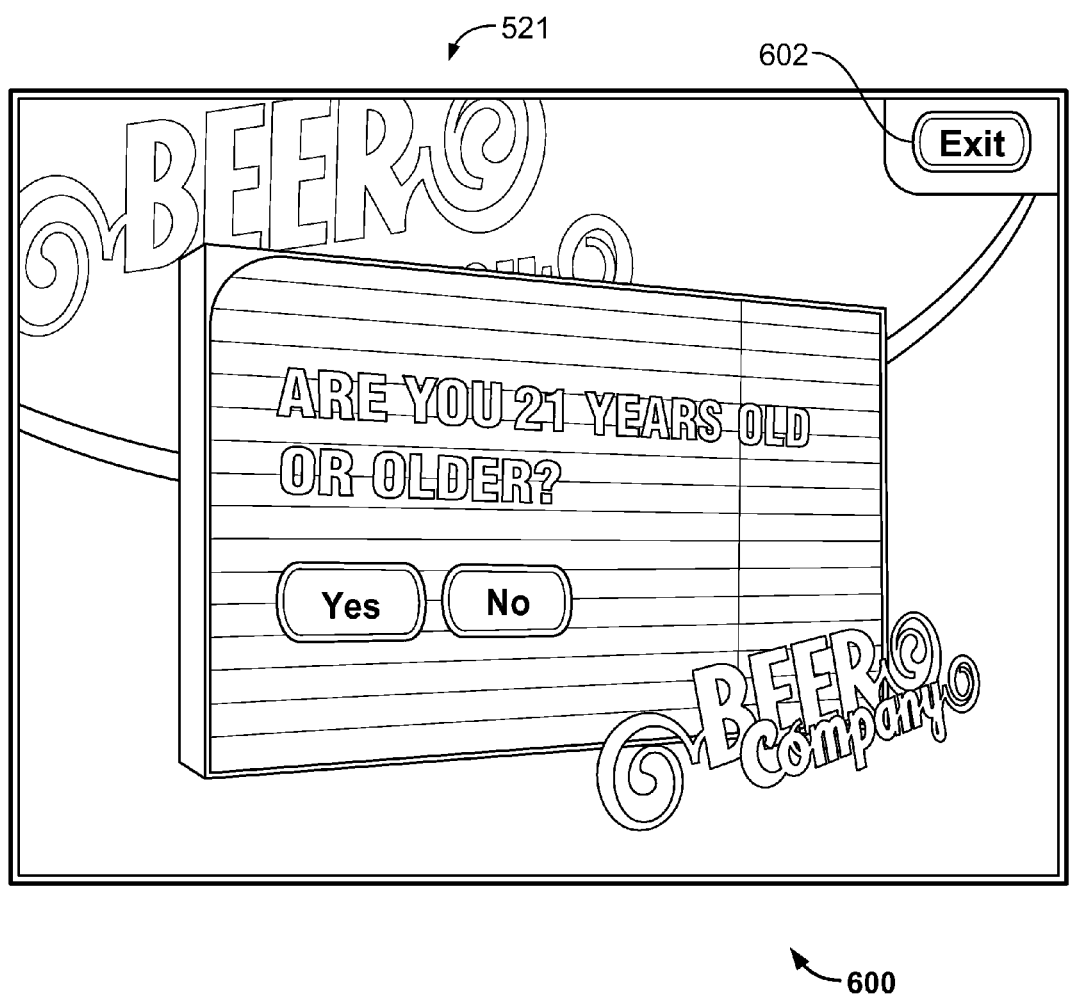
FIGS. 6A-6C illustrate an extended advertising segment, in accordance with embodiments of the present invention.
Figure 6B:
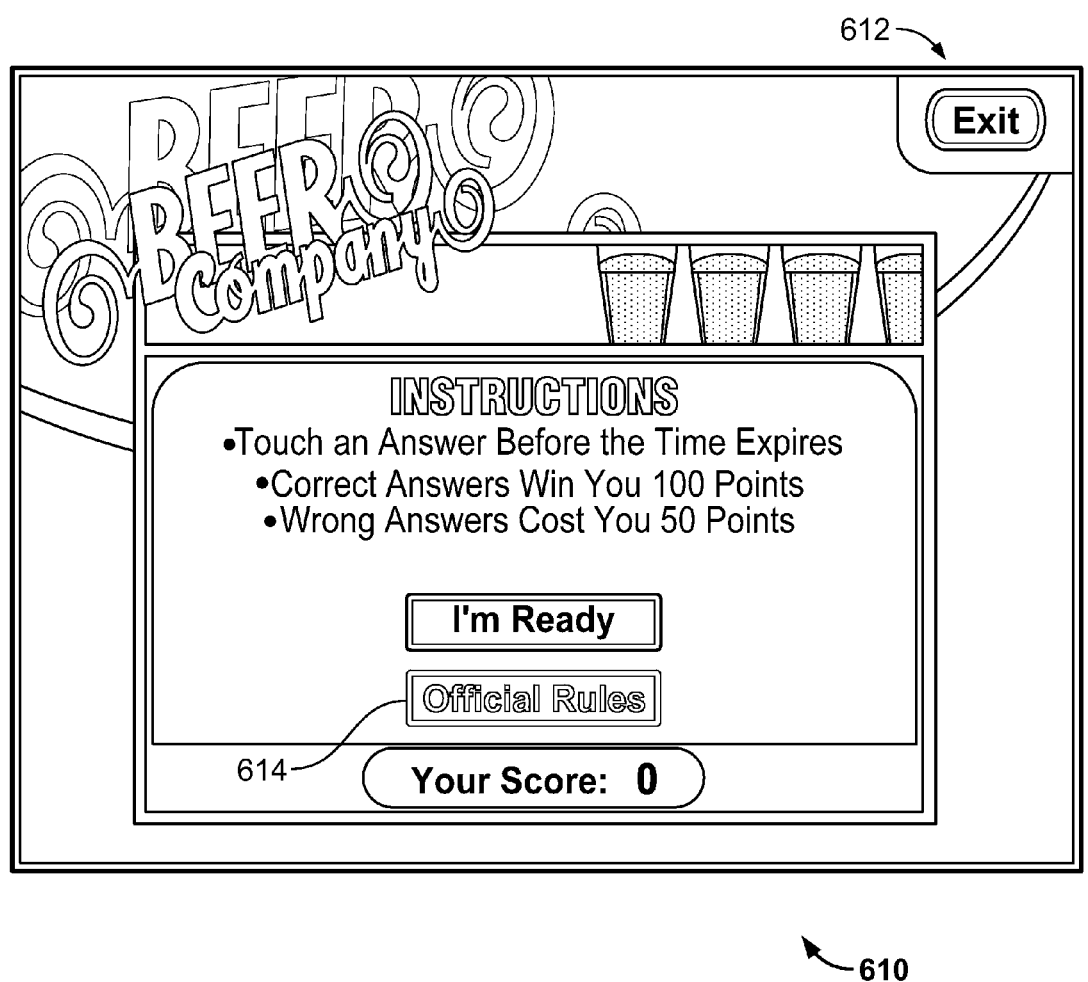
Figure 6C:
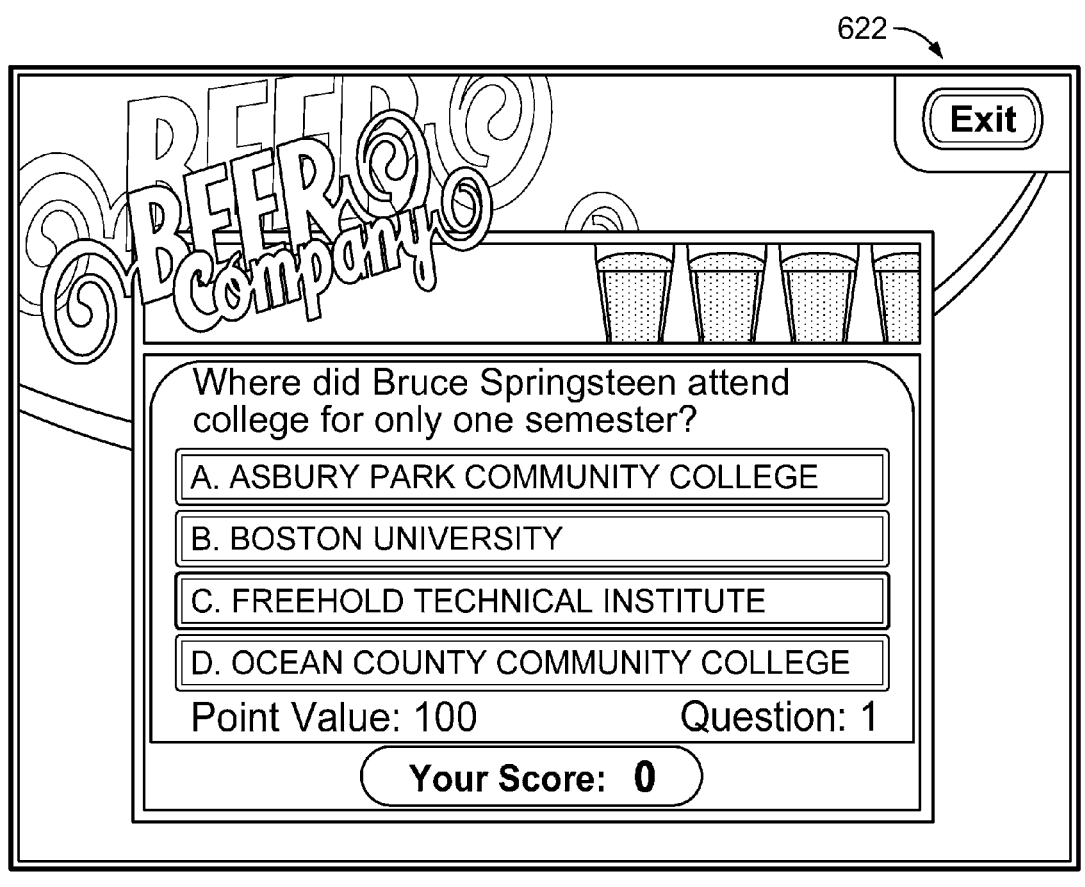

FIGS. 6A-6C illustrate an extended advertising segment, in accordance with embodiments of the present invention. In response to selecting the control input in either screen 520 or 530, the entertainment device 100 may display an extended advertising segment including a sequence of one or more advertising screens. The extended advertising segment can be used for a variety of purposes, including providing additional information regarding a product or service being advertised, engaging the user with an interactive session providing entertainment, or obtaining personal information about the user. Preferably, the extended advertising segment will be used for multiple purposes, such as providing entertainment for the user while improving the brand experience and obtaining additional user information. The transition through the series of screens may be driven by user inputs, or may be controlled exclusively by the entertainment device (e.g., on a predetermined time sequence).

FIG. 6A shows a screen 600, which includes an initial query regarding the user's eligibility to participate in the extended advertising segment, as may be required by local, state, or federal regulations. In this case, the advertisement relates to alcohol, and the initial query requests confirmation that the user is at least 21 years of age. The screen 600 also includes a small control input 602 for exiting the extended advertising segment and returning to the main menu.

FIG. 6B shows a screen 610, which provides instructions for an interactive quiz, including a button 614 to view the official rules for the quiz. According to the rules, the user will receive a first point value in exchange for answering a question correctly and will be penalized a second point value if a question is answered incorrectly. A time limit is optionally imposed for answering each question. Once again, the screen 610 includes a small control input 612 for exiting the extended advertising segment and returning to the main menu.

FIG. 6C shows a screen 620, which includes a multiple choice question. The user may select one of four answers to the question posed. If the question is answered correctly, the first point value is added to the user's total score, and if the question is answered incorrectly, the second point value is deducted from the user's total score.

In some embodiments, the quiz may relate to the product or service being advertised, thereby reinforcing the brand image by entertaining the user with information regarding the brand. In other embodiments, the quiz may be unrelated to the product or service being advertised, with the branding experience provided by background graphics or banners related to the advertised product or service.

The quiz may include a series of screens similar to screen 620 asking the user various questions. At the completion of the quiz, if the user has obtained a predetermined minimum score, the user will be rewarded with one or more credits by the credit manager 410b. The user may then apply these credits towards the performance of additional entertainment content by the entertainment device 100. In other words, if the user wins the quiz, the user may then select one or more songs to be played by the jukebox for free. Alternatively, the user may be rewarded with some other prize or with entry into a drawing for a prize. Other types of rewards are possible.

In some embodiments, it may be desirable to restrict the participation in the interactive extended advertising segments to those users who have already purchased entertainment content to be performed by the entertainment device. This may be particularly desirable in the case of rewards-based advertising segments to prevent users from excessively occupying the entertainment device to the detriment of other users who may wish to purchase entertainment content. Non-purchasing users who monopolize the entertainment device in hopes of winning free credits or other rewards may reduce overall revenue.

In accordance with other embodiments of the present invention, the extended advertising segment may include screens requesting personal information regarding the user. This personal information may include demographic information (such as, e.g., age, gender, income range, residence location, etc.), user-specific information (such as, e.g., name, birthday, home address, e-mail address, etc.), and product preference information (such as, e.g., favorite drink, frequency of dining out, etc.). The personal information may be requested by presenting the user with multiple choices and requesting that the user select one or more. Alternatively, the user may enter the requested information using an alphanumeric keypad. Typical jukebox-type entertainment devices are not provided with keyboards, so a virtual keyboard which graphically and functionally simulates a conventional computer keyboard may be provided on the touch sensitive display 102.

Again, the user may be rewarded for participation in the survey by being granted credits, prizes, or other benefits.

Advertising Content Tracking and Reporting

As described above, a user interaction with an advertisement may result in the collection of data and/or responses from the user. Data collection may be explicit (e.g., the user is presented with a survey, quiz, sweepstakes registration, or prompted to enter an email address, etc.), or implicit (e.g., logic in the entertainment device records the performance of advertising content and what the user does, and collects and reports that information). The types of data to be gathered in each case may differ based on the desires of the advertiser, but may include personal information (e.g., age, gender, and email address), preference information (e.g., favorite types of music or videos), trivia questions, etc. The length of time users spend interacting may also be measured and reported.

The user interaction information stored by each entertainment device 100 in a network may be reported back to the host system 210. The host system 210 may then associate the user interaction information with venue information. This venue information may comprise a geographic location of the venue or a performance history of the entertainment device, as will be described in greater detail below.

In some embodiments, the advertisements that support interaction are typically presented in advertising mode, where the advertisements occupy the full screen of the GUI. This allows the users to focus their attention on interacting with the advertising content (and the advertiser's brand). Alternatively, the interactive advertisements are provided in hybrid mode including separate regions dedicated to selection mode and advertising mode.

Advertisers routinely contractually require data to quantify the number of advertisements presented during an advertising campaign. When applicable, they also require personal and preference data entered by users in response to their advertisements. The ability to provide accurate data regarding the number of times an advertisement is performed may be substantially more valuable to an advertiser than mere estimates regarding expected numbers of performances.

In accordance with some embodiments of the present invention, certain types of data may be accumulated and/or aggregated periodically on the entertainment device and sent to a collection point (e.g., the host system 210). In some embodiments, this historical data stores the number of times each advertisement was displayed over some time interval, and the number of times a user responded to the content in some way. Specific data entered by users that are not aggregated (such as survey responses) may be sent to collection points individually as the data is received. This can help to ensure that the data is reported as soon as possible. All data stored at the collection point includes information regarding the identity of the entertainment device at which the data was received, the time (or over what time interval) the data was recorded, and the identity of the advertising content with which the data is associated. In this way, very accurate reports may be delivered to advertisers to indicate the number of "impressions" delivered for each advertisement. If desired, the report can provide a breakdown by time, geography, or other criteria of interest to the advertiser.

In accordance with some embodiments, advertisers are provided the ability to analyze data regarding advertisement campaigns based on venue location, demographic profile of the expected patrons of the venue, customer profile, or other types of information, as desired. Web sites commonly request and collect information regarding visitors and page impressions. However, due to the nature of the Internet, it is generally difficult or even impossible to obtain detailed information about the user unless the user voluntarily provides the information or the user's activities are monitored. Thus, when an advertiser pays for a banner advertisement, the advertiser generally only learns about the number of clicks on the advertisement and possibly the IP addresses of the users' computers.

In accordance with embodiments of the present invention, the information regarding advertisements provided by the entertainment device is associated with information regarding the venue. In some embodiments, the information includes information regarding user interactions with the advertisements. Because the entertainment devices 100 are typically not moved very often, the host system 210 may store detailed information regarding the venue in which each entertainment device 100 is located. This information may include, e.g., the geographic location of the entertainment device 100, the type of venue in which the entertainment device 100 is located, and the type of entertainment content selected by users of the entertainment device 100 at that venue. As a result, even if the individual users of the entertainment device 100 do not enter personal information about themselves, and thus remain anonymous, the advertising provided by the entertainment device 100 can still be correlated with known information regarding the venue, thereby improving the benefit to the advertiser.

The host system 210 may store a record of each entertainment device 100 in the entertainment network 200. This record can include the address of the venue in which the entertainment device 100 is located and/or the geographic/metropolitan region of the venue. Many advertisers coordinate their advertising campaigns based on metropolitan and micropolitan statistical areas defined by the United States Office of Management and Budget (OMB) based on Census Bureau data. Thus, an advertiser may be able to analyze the data from an advertising campaign by correlating the information gathered at each entertainment device with information regarding the venue in which the entertainment device is located. For example, the advertiser may be able to compare the types of responses to an advertisement in one metropolitan region with the responses to the same advertisement in another region. In addition, the advertiser may be able to locate the geographic regions in which the advertisement was most effective by identifying the entertainment devices having the highest rate of response to the advertisement.

In addition, the advertiser may be able to identify the geographic regions in which a certain response was most often received. For example, an interactive advertisement may query the user as to the user's favorite brand of soft drink. Each of the user responses are collected by the entertainment device and reported to the host system. The advertiser may then be able to analyze all of the responses based on the locations of the various entertainment devices. Thus, the advertiser can learn that Brand X soft drink is most popular in the San Francisco metropolitan area, while Brand Y soft drink most popular in the New York metropolitan area.

If this advertisement had been presented in a banner advertisement on an Internet web site, the query regarding the soft drink would need to be followed by additional queries regarding the user's location in order to provide the advertiser with this type of geographic analysis. Unfortunately, for privacy reasons, Internet users may be unwilling to provide personal information in response to banner advertisements. In addition, Internet users may be unwilling to take the steps of answering additional questions regarding their locations. Furthermore, users may not be truthful in their responses to such as query. Thus, the survey would not be able to provide consistent and reliable geographic data. In contrast, because the location of each entertainment device is known, the geographic information need not be entered by the user. This can save the user time by eliminating the extra steps involved with entering geographic information, and allows the user responding to the advertisement to remain completely anonymous, while still providing useful geographic information to the advertiser.

In other embodiments, the data collected from user interactions with advertisements may be correlated with characteristics of the venues in which the entertainment devices are located. For example, the host system may store records for each entertainment device which include the information regarding the venue, such as the type of venue or the expected patronage. The records may include various categories for types of venues, such as bar, nightclub, arcade, restaurant, or adult entertainment club. Thus, an advertiser may be able to analyze the user responses and categorize the responses by the type of venue. For example, the advertiser may be able to analyze the data to determine that Brand X soft drink is most popular in bars, while Brand Y soft drink is most popular in arcades.

In yet other embodiments, the data collected from user interactions with advertisements may be correlated with historical performance information of the entertainment devices. For example, the host system may store records for each entertainment device which include a history of entertainment content requested at each entertainment device. Thus, an advertiser may be able to determine that at venues where over 50% of the requested songs are country music songs, Brand X soft drink is the most popular, while at venues where over 50% of the requested songs are rap songs, Brand Y soft drink is the most popular.

In another example, an advertiser promoting a new album by a particular band may desire to learn the type of music and particular songs most requested at venues where the album advertisement had the highest frequency of user response (e.g., highest click-through rates). Thus, the advertiser can obtain additional information regarding the demographics of users interested in the album. This can assist the advertiser with target future marketing campaigns for the album and the band.

It will be understood that the types of analyses described above are merely exemplary, and the data collected by the entertainment devices may be analyzed in different ways.

Distribution and Activation of Advertising Content

In accordance with embodiments of the present invention, advertising content may be distributed to the various entertainment devices 100 in the entertainment network 200, and the display of the advertising content is controlled by an attribute of the entertainment device 100. As a result, advertising content can be distributed and then later selectively activated by the host system 210.

In one embodiment, all current advertising content and a set of instructions that control the display of that content are distributed to a set of entertainment devices 100 on the network 200. The advertising content includes all of the files used to generate the advertisement for display on the entertainment device 100. This includes all graphics, text, Flash SWF files, etc., that are used for the advertisements. The instructions may include references to one or more configuration properties that must be set, or any operating conditions that must be met in order to allow the advertising content to be displayed. Thus, a set of entertainment devices 100 may be provided with all of the files necessary for display of the advertisement. However, the advertisement may be selectively activated for only a subset of the entertainment devices 100.

Preferably, the set of entertainment devices 100 provided with the advertising files includes all of the entertainment devices 100 in the network. However, in other embodiments, the set of entertainment devices 100 provided with the advertising files is a subset of the entertainment devices 100 in the network.

As a result of predistributing the advertising content to all of the entertainment devices 100, when it is desired to activate an advertisement on one or more entertainment devices 100, there would be no delay associated with downloading all of the files for that advertisement to each entertainment device 100. Each entertainment device 100 would already contain all of the necessary files. Thus, as soon as the conditions for display are met, the advertisement can be displayed with minimal delay. These conditions can be satisfied by manual activation (e.g., receiving a short message from the host system) or by automatic activation (e.g., upon the occurrence of a predetermined event or the satisfaction of a predetermined attribute), as described in more detail below.

The advertising manager 410*d* of the entertainment device 100 applies the logic of the instructions every time it displays advertisement content in order to determine if a given advertisement may be shown or not. When in hybrid or advertising mode, the user interface includes one or more eligible regions in which advertisements may be displayed. For each region, there may be multiple advertisements that may be shown in a "round robin" rotation. Thus, each time a new screen is displayed having a suitable advertising region, the next advertisement in sequence will be shown. This rotation process is similar to the process used to display banner advertisements on web sites.

In accordance with some embodiments, the advertising content files may be transmitted in compressed form from the host system 210 to the entertainment devices 100. Each entertainment device 100 may be configured to retrieve all new content identified by the manifest (including entertainment content, configuration files, and advertising content), as described above. When the new content is retrieved, the various files are uncompressed by the control module 410 and stored in the appropriate locations (e.g., the configuration files are stored in the operational database 406 and the entertainment and advertising content are stored in the file system 404).

In other embodiments, the advertising content files are retrieved by the entertainment device 100 after the control module 410 has determined that the entertainment device has satisfied the required condition for displaying the advertising content. The advertising content files may then be stored on the entertainment device in preparation for future display. Accordingly, only those entertainment devices 100 that will actually display the advertisement will retrieve the advertising content files.

In yet other embodiments, the advertising content files may be retrieved and displayed in real-time. Thus, the entertainment device 100 will wait until it comes time to display an advertisement. Then, the advertising content files will be retrieved and immediately displayed.

The conditions controlling the display of advertisements may be based on a variety of factors. For example, an advertising configuration file may identify specific entertainment devices 100 which would display a particular advertisement. Alternatively, the configuration file may identify a specific entertainment device characteristic. Alternatively, the configuration file may specify either a network-wide criteria or a device-specific criteria that must be met before the advertisement is displayed. In yet other embodiments, a combination of factors may be employed.

In the first instance, the advertising configuration file may identify specific entertainment devices 100 which would display a particular advertisement. This may be used when the advertisement is being deployed on a very limited basis, such as if a venue wishes to advertise a current special or an upcoming event.

In the second instance, an advertisement is displayed on entertainment devices 100 having a specific characteristic. The characteristic may comprise a type of entertainment device 100. For example, a particular advertisement may only be displayed on freestanding entertainment devices, and not on wall-mounted or tabletop entertainment devices, or only on those of one manufacturer, and not on those of others.

Advertisers often want to target advertisement campaigns to a fixed set of geographies or metropolitan areas, or to locations that meet a given demographic profile. Thus, the characteristic determining whether an advertisement is displayed may comprise the geographic location of the entertainment device 100. For example, the configuration file may specify that all entertainment devices located in the San Francisco metropolitan area will display Advertisement X. All entertainment devices located outside that area will not display the advertisement.

This geographic targeting of advertisements may provide several benefits. For example, an advertiser whose product or service is only located in a particular geographic region need not pay for advertisements in other regions. Thus, a restaurant in San Francisco may purchase an advertisement to be displayed only on entertainment devices 100 located in the city of San Francisco or in the San Francisco metropolitan area. The geographic targeting may be even more narrowly focused on entertainment devices 100 located in a particular neighborhood or street. In other cases, an advertiser with a nationwide product may still wish to limit the advertising campaign to certain geographic regions, thereby focusing the advertising expenditures on the most desirable or important markets.

In other embodiments, the advertisements may be targeted to specific entertainment devices based on characteristics of the venues in which the entertainment devices are located. For example, the host system 210 may store records which include the information regarding the venue, such as the type of venue or the expected patronage. The host system 210 may include various categories for types of venues, such as bar, nightclub, arcade, restaurant, or adult entertainment club. Thus, an advertiser targeting youths (such as to advertise a videogame) may limit the display of advertisements to the venues identified as arcades. In contrast, an advertiser targeting adults (such as to advertise an alcoholic beverage) may limit the display of advertisements to the venues identified as bars.

In the third instance, the advertising configuration file may identify specific network-wide criteria that must be satisfied before displaying an advertisement on a particular entertainment device 100. This network-wide criteria may comprise a characteristic of a particular entertainment device relative to the entertainment devices across the network. For example, an advertisement may only be displayed on the top 100 revenue-generating entertainment devices in the network. Alternatively, the advertisement may only be displayed on the 100 entertainment devices in the network that have played a particular song with the highest frequency. Other variations are possible. The host system 210 may update the various entertainment devices of their standing for these network-wide criteria in the periodic configuration updates.

In the fourth instance, the advertising configuration file may identify specific device-specific criteria that must be satisfied before displaying an advertisement on a particular entertainment device 100. This device-specific criteria may be based on historical performance information for the entertainment device.

For instance, an advertisement may be displayed on all entertainment devices that have met a performance target for a predetermined period of time. The host system 210 may store records which include a history of entertainment content requested at each entertainment device 100. Thus, an advertiser promoting a new album by a particular band may limit the display of advertisements to those entertainment devices 100 where the users have previously requested songs by that artist or by other artists whose target demographic is expected to be similar to the new album being promoted. The targeted entertainment devices 100 may be identified based on, e.g., a minimum number of requests of the identified songs or artists or a minimum percentage of requests of the identified songs or artists from the overall total number of songs requested. Alternatively, the required condition for displaying the advertisement may be that the entertainment device has averaged a minimum revenue target over the past week. Because the condition is device-specific, the entertainment device need not receive an update from the host system 210 before activating the advertisement. As soon as the advertising manager 410d detects that the condition has been met, the advertisement will be displayed.

The contracts for many advertisement campaigns require that minimum numbers of impressions be delivered for various advertisements in the campaign. By gathering hourly counts of advertisement impressions delivered, it is easy for advertising and product managers to monitor if the campaign is progressing as planned on a regular basis, e.g., hourly, daily, weekly, or monthly. Once the required number of impressions have been delivered, it is also easy to terminate a campaign by centrally clearing the configuration setting that controls which devices show the advertisement content. Such configuration changes typically propagate through the network in under one hour. By the same token, it is also easy to add more devices to a campaign that is going well, and which the advertiser wishes to expand. Within one hour, many additional devices can start showing an advertisement campaign. In the preferred implementation, because the entertainment devices already have the advertising content locally stored, there is no delay associated with retrieving those files.

The instructions that control the display of advertising content may be provided in one or more configuration files, such as an XML file. In one embodiment, two XML files are used to control the display of graphical elements in the GUI of the entertainment device 100: AttractLoops.xml and Music-Selection.xml. Sample configuration files are shown below. These configuration files may be periodically distributed to each entertainment device 100 and define the conditions necessary in order for a particular advertisement to be displayed. The conditional display of advertisements is based on one or more attributes of the entertainment device 100. These attributes may be stored as properties in the operational database 406, and may be based on any of a variety of properties of the entertainment device 100, as described above.

The AttractLoops.xml file below defines the motion graphics files that may be displayed on the entertainment device 100 as attract loops and supplies the rules and conditions under which each graphic may be displayed.

The <promotions> tag bounds the entire XML document.

Each <group> tag bounds a series of one or more media files that are intended to be shown consecutively during attract mode operation of the entertainment device 100. After the last media file in a group has played, the entertainment device 100 will return to its main UI screen for a period of time. Once a suitable idle time has elapsed without user interaction, the entertainment device 100 will display the media files in the next group in sequence. After showing the final group, the entertainment device 100 returns to the first group in the XML file.

Each <media> tag specifies one file that may be displayed as an attract loop. If there are no "conditional tags" nested within the media tag, the file is always displayed. If there are one or more conditional tags within the media tag, however, the media file is shown only if all conditions are "true". This test is typically performed by looking up a specified parameter in the operational database 406.

The following are exemplary conditional tags that may be applied to a media tag. If a media tag contains multiple conditional tags, all conditional tags must all evaluate to true for the media file to be shown.

<jukeNowTest mode='xxx'/>: Only display the media file if the entertainment device's current JukeNow mode is 'xxx'. The jukeNowTest parameter identifies an operating state of the entertainment device 100.

<configTest subsystem='sss' name='nnn' value='vvv'/>: Only display the media file if there exists an entry in the operational database 406 that has the subsystem and name specified, and which matches the value specified.

<networkTest internet='status' dataCenter='status'/>: Only display the media file if current network status is either connected or disconnected. May specify either one or both of internet and datacenter attributes. If both are specified, both must be true.

<partnerTest current='partner'/>: Only display the media file if the entertainment device hardware was manufactured by the partner named.

<dateTest before='mm-dd-yyyy' after=mm-dd-yyyy' from='mm-dd-yyyy' to='mm-dd-yyyy' forDays='nn'/>: Only display the media file if the entertainment device's current date satisfies the test. This conditional tag may require the "before" attribute alone, the "after" attribute alone, or the "from" attribute paired with either the "to" or the "forDays" attribute.

An event tag may also be nested within a media tag. When present, the event tag indicates an action to be taken if a user touches the screen while the attract loop is playing.

<event type='featuredAlbum' id='nnnnnn'/>: If touched, display the featured album page with the album whose ID is specified.

---

Sample AttractLoops.xml

```
<?xml version="1.0" encoding="utf-8"?>
<promotions>
<group id="1">
    <media fileName="d:\ecast\ads\avis\alCoolestJukebox.mpg">
    </media>
    <media fileName="d:\ecast\ads\avis\alJukeNow_preConnected.mpg">
        <jukeNowTest mode="preConnected"/>
    </media>
    <media fileName="d:\ecast\ads\avis\alJukeNow_justConnected.mpg">
        <jukeNowTest mode="justConnected"/>
    </media>
    <media fileName="d:\ecast\ads\avis\alJukeNow_ongoingOperation.mpg">
        <jukeNowTest mode="ongoingOperation"/>
    </media>
    <media fileName="d:\ecast\ads\avis\alMakeMineFirst.mpg">
        <configTest subSystem="Music" name="MMF_Enable" value="True"/>
    </media>
    <media fileName="d:\ecast\ads\avis\alCreditCard.mpg">
        <configTest subSystem="Hardware" name="UsesCC" value="True"/>
        <networkTest internet="connected"/>
    </media>
</group>
<group id="2">
    <media fileName="d:\ecast\ads\avis\alNSM.mpg">
        <partnerTest current="NSM"/>
    </media>
    <media fileName="d:\ecast\ads\avis\alRockola.mpg">
        <partnerTest current="RockOla"/>
```

Sample AttractLoops.xml

```xml
    </media>
    <media fileName="d:\ecast\ads\avis\alView.mpg">
      <partnerTest current="View"/>
    </media>
  </group>
  <group id="3">
    <media fileName="d:\ecast\ads\avis\alNewMusic.mpg">
      <configTest subSystem="Advertising" name="ShowNewMusicLoop" value="True"/>
    </media>
  </group>
  <group id="4">
    <media fileName="d:\ecast\ads\avis\alWifi.mpg">
      <configTest subSystem="Hardware" name="UsesWifi" value="True"/>
      <networkTest internet="connected"/>
    </media>
  </group>
  <group id="5">
    <media fileName="d:\ecast\ads\avis\alFeaturedAlbum.mpg">
      <configTest subSystem="Music" name="Featured_Album" value="557335"/>
      <event type="featuredAlbum" id="557335"/>
    </media>
  </group>
  <group id="10004">
    <media fileName="d:\ecast\ads\avis\alPromo1.mpg">
      <configTest subSystem="Advertising" name="ShowBeerCoAdCampaign" value="True"/>
      <configTest subSystem="Advertising" name="ShowBeerCoAttractLoop" value="True"/>
    </media>
  </group>
</promotions>
```

The MusicSelection.xml file shown below defines the graphics files that are to be placed within the main user interface for the entertainment device 100, and supplies the rules and conditions under which each graphic may be displayed.

The <MusicSelection> tag bounds the entire XML document.

Each <group> tag bounds a series of one or more media files that are intended to be shown consecutively ("round-robin") during the presentation of the various screens of the GUI. The GUI is defined such that predefined regions of the screen are available for graphics. The "name" attribute on this tag indicates in which GUI region each media file belongs.

Each <media> tag specifies one file that may be displayed as a graphical element in the GUI, within the screen region indicated by the group tag. If there are no conditional tags nested within the media tag, the file is always displayed when its turn comes around. If there are one or more conditional tags within the media tag, however, the media file is shown only if the tags all test "true".

The conditional tags that may be applied to a media tag are listed below. These behave substantially the same as the conditional tags described for the AttractLoop.xml file above. If a media tag contains multiple conditional tags, they must all evaluate to true for the media file to be shown.

```xml
<jukeNowTest mode='xxx' />
<configTest subsystem='sss' name='nnn' value='vvv' />
<networkTest internet='status' dataCenter='status' />
<partnerTest current='partner' />
<dateTest before='yyyy-mm-dd' after='yyyy-mm-dd'
   from='yyyy-mm-dd' forDays='nn' />
```

The <effects> and <interactiveMedia> tags may also be nested within a media tag. When present, the effects tag may specify transition instructions to first display the artwork. The interactiveMedia tag is used to specify an associated full-screen Interactive Flash application that should be started when the media is touched.

<effects displayTime="f.f" transitionType="tttt" transitionTime="f.f"/>: When displaying a media file for display in a banner-style screen region, the media file is displayed with the indicated transition. The media file is then applied over the transition time indicated in the configuration file in seconds. The next media file in the group will be shown after the full displayTime has elapsed. If the effects tag is not supplied, or if it has no displayTime attribute, the media file will display for a default period, e.g., 3.0 seconds. If there is no transitionType specified, the setting defaults to 'none', and no transition will be applied. If a transition is specified, but there is no transitionTime attribute, the transition time will default to 0.5 seconds. The value of transitionTime should always be less than that of displayTime.

<interactiveMedia fileName="fff.swf" idleTimeoutSecs="ii" absoluteTimeoutSecs="aa" autoPlay='bool' maxSubmit="n" maxCredits="m"/>: When a media file in any group other than the banners group is touched on the screen, an extended advertisement, such as, e.g., an interactive Flash movie, may be played. The fileName attribute specifies a media file (e.g., a Flash .SWF file) stored in the file system 404 of the entertainment device 100. The following attributes are optional and may default to a predetermined value if omitted.

idleTimeoutSecs—45: Number of seconds for the extended advertisement to timeout if no user interaction takes place for this interval.

absoluteTimeoutSecs—180: Number of seconds for the extended advertisement to timeout if the total execution time exceeds this interval.

autoPlay—false: This value is set to true to have the Flash container send a play command to the SWF.

maxSubmit—1: This parameter defines the maximum number of FORM submissions permitted before the Flash container will ignore further submissions.

maxCredits—0: This parameter defines the maximum number of free credits permitted before the Flash container will no longer issue more.

Sample MusicSelection.xml

```xml
<?xml version="1.0" encoding="utf-8"?>
<MusicSelection>
<group name="banners">
    <media fileName="D:\Ecast\Ads\Images\bnRockola.tga" id="6">
      <effects displayTime="5" transitionType="fadeIn" transitionTime="0.5"/>
      <partnerTest current="RockOla"/>
    </media>
    <media fileName="D:\Ecast\Ads\Images\bnNSM.tga" id="7">
      <effects displayTime="5" transitionType="fadeIn" transitionTime="0.5"/>
      <partnerTest current="NSM"/>
    </media>
    <media fileName="D:\Ecast\Ads\Images\bnView.tga" id="8">
      <effects displayTime="5" transitionType="fadeIn" transitionTime="0.5"/>
      <partnerTest current="View"/>
    </media>
    <media fileName="D:\Ecast\Ads\Images\bnCreditCard.tga" id="9">
      <effects displayTime="5" transitionType="slideBottom" transitionTime="0.3"/>
      <configTest subSystem="Hardware" name="UsesCC" value="True"/>
      <networkTest internet="connected"/>
    </media>
</group>
<group name="JCD1">
    <media fileName="D:\Ecast\Ads\Flash\uiEcastConfirm1.swf" type="Flash" id="16">
    </media>
    <media fileName="D:\Ecast\Ads\Flash\uiAd1Confirm1.swf" type="Flash" id="10002">
      <configTest subSystem="Advertising" name="ShowBeerCampaign" value="True"/>
    </media>
    <media fileName="D:\Ecast\Ads\Flash\uiAd1Confirm1.swf" type="Flash" id="10002">
       <configTest subSystem="Advertising" name="ShowBeerCampaign" value="True"/>
    </media>
</group>
<group name="JTY1">
    <media fileName="D:\Ecast\Ads\Flash\uiEcastEndOfSession2.swf" type="Flash" id="25">
      <configTest subSystem="Advertising" name="ShowBeerCampaign" value="False"/>
       <interactiveMedia fileName="D:\Ecast\Ads\Flash\uiEcastFullScreen1.swf" idleTimeoutSecs="45" absoluteTimeoutSecs="240"/>
    </media>
    <media fileName="D:\Ecast\Ads\Flash\uiAd1EndOfSession1.swf" type="Flash" id="10000">
       <configTest subSystem="Advertising" name="ShowBeerCampaign" value="True"/>
       <configTest subSystem="Advertising" name="ShowBeerEndSession" value="False"/>
       <interactiveMedia fileName="D:\Ecast\Ads\Flash\uiAd1FullScreen1.swf" idleTimeoutSecs="45" absoluteTimeoutSecs="240"/>
    </media>
</group>
  <group name="JMN1">
    <media fileName="D:\Ecast\Ads\Images\uiEcastMainTower1.jpg" type="Image" id="20">
       <interactiveMedia fileName="D:\Ecast\Ads\Flash\uiEcastFullScreen2.swf" idleTimeoutSecs="45" absoluteTimeoutSecs="120"/>
    </media>
  </group>
<group name="JAV1">
    <media fileName="D:\Ecast\Ads\Flash\uiEcastAlbumTower1.swf" type="Flash" id="21">
```

-continued

Sample MusicSelection.xml

```
    </media>
    <media fileName="D:\Ecast\Ads\Flash\uiAd1AlbumTower1.swf" type="Flash"
id="10003">
        <configTest subSystem="Advertising" name="ShowBeerCampaign"
value="True"/>
    </media>
    <media fileName="D:\Ecast\Ads\Flash\uiEcastAlbumTower4.swf"
type="Flash" id="24">
    </media>
    <media fileName="D:\Ecast\Ads\Flash\uiAd1AlbumTower1.swf" type="Flash"
id="10003">
        <configTest subSystem="Advertising" name="ShowBeerCampaign"
value="True"/>
    </media>
</group>
<group name="JFA1">
    <media fileName="D:\Ecast\Ads\Flash\uiEcastAlbumTower1.swf"
type="Flash" id="21">
    </media>
    <media fileName="D:\Ecast\Ads\Flash\uiAd1AlbumTower1.swf" type="Flash"
id="10003">
        <configTest subSystem="Advertising" name=" ShowBeerCampaign"
value="True"/>
    </media>
</group>
</MusicSelection>
```

Embodiments of the present invention may provide various advantages not provided by prior art systems. For example, the commercial advertisements displayed by the entertainment device may be used to promote products and/or services that are not directly provided by the entertainment device. In some embodiments, the advertised product and/or service may be sold or offered at the venue in which the entertainment device is located. For example, if the entertainment device is located in a bar or nightclub, the advertisement may be related to a product sold at the venue, such as particular brand of alcohol. In other embodiments, the advertised product and/or service may be related to the venue in another way. For example, if the entertainment device is located in an arcade or other located frequented by young adults, the advertisement may promote a new videogame for use on home game playing systems. This videogame need not be purchasable at that venue, but the advertiser may utilize the entertainment device to target venues frequented by the target demographic.

Users typically take up to five minutes to browse through the music catalog before making all their selections. Thus, the entertainment device provides a highly-desirable advertising channel for reaching consumers.

In addition, the advertisements may include rich media advertisements programmed using, e.g., the Macromedia Flash programming platform. This can be particularly advantageous because many advertisers utilize Flash programming for banner advertisements displayed on web sites on the Internet. Thus, the advertisers are already familiar with the Flash multimedia authoring program and can quickly and easily adapt existing advertisements for implementation on an entertainment system for use in public venues. This enables the advertisers to utilize new distribution channels to reach larger groups of consumers. In addition, the Flash programmed advertisements may utilize an XML API for utilizing services performed by the control module 410, such as logging and configuration, the granting of promotional credits in exchange for interaction with advertisements, and to transmit user entered information to the host system 210.

The interactive quizzes and/or rewards provided by embodiments of the present invention can provide incentives for users to remain engaged with entertainment device for the complete extended advertising segment. This is particularly beneficial for jukebox-type entertainment devices because users typically cease interaction with a jukebox after selecting the desired songs to be played. The user must be presented with a compelling reason not to walk away from the jukebox after the user's final song has been selected. Quizzes provide entertainment and rewards provide substantive benefits to the user in the form of free songs.

While the invention has been described in terms of particular embodiments and illustrative figures, those of ordinary skill in the art will recognize that the invention is not limited to the embodiments or figures described. For example, various types of reporting analysis and activation criteria are described. It will be understood that different types of analyses and activation criteria may be used.

In addition, the embodiments described herein relate to either freestanding jukebox or countertop devices. In other embodiments, the entertainment devices may take other forms and may provide different types of entertainment content, such as video.

In the examples provided above, the conditional display of advertising content is defined by XML files that are distributed to all of the entertainment devices in the network. In other embodiments, the display of advertisements on entertainment devices may be controlled by other mechanisms. For example, a set of instructions controlling the display of advertisements may be transmitted to one or more entertainment devices. In the example described above with respect to the XML code samples, each entertainment device in the network may receive the same XML configuration files which define the conditions for determining whether and how an advertisement is to be displayed. In other embodiments, the host system may transmit device-specific instructions to each entertainment device. Thus, not all of the entertainment devices may receive the same instructions for displaying advertisements. The host system may apply a first condition to determine which entertainment devices are to receive a particular instruction, and the instruction transmitted to those entertainment devices may define a second condition for controlling the display of advertisements. Other variations are possible.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of processing data from a plurality of entertainment devices, comprising:
   receiving user interaction information, said user interaction information comprising information regarding user interaction with an advertisement displayed on an entertainment device, said entertainment device being configured to perform entertainment content;
   associating the user interaction information with venue information regarding a venue in which the entertainment device is located, wherein the information regarding user interaction with the advertisement displayed on the entertainment device is correlated with one or more characteristics of the venue in which the entertainment device is located; and
   displaying a targeted advertisement on the entertainment device, wherein the targeted advertisement is selected based at least in part on the information regarding user interaction with the advertisement displayed on the entertainment device that is correlated with one or more characteristics of the venue in which the entertainment device is located, wherein the targeted advertisement is selected further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
   and wherein the model type of the entertainment device includes a freestanding entertainment device type, a wall-mounted entertainment device type, and a tabletop entertainment device type, and the historical performance related characteristic of the entertainment device includes a revenue-generating based ranking.

2. The method of 1, wherein:
   wherein said venue information comprises a geographic location of the venue.

3. The method of 1, wherein:
   wherein said venue information comprises a type of venue.

4. The method of 1, wherein:
   wherein said venue information comprises a demographic profile of expected venue patrons.

5. The method of 1, wherein:
   wherein said user interaction information comprises a number or frequency of user interaction with the advertisement.

6. The method of 1, wherein:
   wherein said user interaction information comprises user-entered information.

7. The method of 6, wherein:
   wherein said user-entered information comprises user selections in response to one or more queries.

8. The method of 6, wherein:
   wherein said user-entered information comprises personal information regarding the user.

9. The method of 1, wherein:
   said entertainment device is configured to perform entertainment content in exchange for payment.

10. The method of 1, further comprising:
    associating the user interaction information with time information regarding a time during which each user interaction occurred.

11. A system for processing data from a plurality of entertainment devices, comprising:
    an entertainment device database including information regarding a plurality of entertainment devices configured to perform entertainment content;
    a storage system storing user interaction information received from the plurality of entertainment devices, said user interaction information comprising information regarding user interaction with an advertisement displayed on an entertainment device; and
    a processor configured to associate the user interaction information for one of the plurality of entertainment devices with venue information regarding a venue in which the one of the plurality of entertainment devices is located, wherein the information regarding user interaction with the advertisement displayed on the entertainment device is correlated with one or more characteristics of the venue in which the entertainment device is located, wherein the information regarding user interaction with the advertisement displayed on the entertainment device that is correlated with one or more characteristics of the venue in which the entertainment device is located is used at least in part for selecting a targeted advertisement for the entertainment device, wherein the selecting a targeted advertisement is further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
    and wherein the model type of the entertainment device includes a freestanding entertainment device type, a wall-mounted entertainment device type, and a tabletop entertainment device type, and the historical performance related characteristic of the entertainment device includes a revenue-generating based ranking.

12. The system of 11, wherein:
    wherein said venue information comprises a geographic location of the venue.

13. The system of 11, wherein:
    wherein said venue information comprises a type of venue.

14. The system of 11, wherein:
    wherein said venue information comprises a demographic profile of expected venue patrons.

15. The system of 11, wherein:
wherein said user interaction information comprises a number or frequency of user interaction with the advertisement.

16. The system of 11, wherein:
wherein said user interaction information comprises user-entered information.

17. The system of 16, wherein:
wherein said user-entered information comprises user selections in response to one or more queries.

18. The system of 16, wherein:
wherein said user-entered information comprises personal information regarding the user.

19. The system of 11, wherein:
said plurality of entertainment devices are configured to perform entertainment content in exchange for payment.

20. The system of 11, wherein:
said processor is further configured to associate the user interaction information with time information regarding a time during which each user interaction occurred.

21. A method of processing data from a plurality of entertainment devices, comprising:
receiving advertisement performance information regarding user interaction with advertising content on each of the plurality of entertainment devices, each entertainment device being configured to perform entertainment content upon request from users; and
associating the advertisement performance information with venue information regarding a venue in which the entertainment device is located, wherein the advertisement performance information regarding user interaction with the advertising content is correlated with one or more characteristics of the venue in which the entertainment device is located, wherein the advertisement performance information regarding user interaction with the advertising content that is correlated with one or more characteristics of the venue in which the entertainment device is located is used at least in part for selecting a targeted advertisement for the entertainment device, wherein the selecting a targeted advertisement is further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
and wherein the model type of the entertainment device includes a freestanding entertainment device type, a wall-mounted entertainment device type, and a tabletop entertainment device type, and the historical performance related characteristic of the entertainment device includes a revenue-generating based ranking.

22. The method of 21, wherein:
wherein said venue information comprises a geographic location of the venue.

23. The method of 21, wherein:
wherein said venue information comprises a type of venue.

24. The method of 21, wherein:
wherein said venue information comprises a demographic profile of expected venue patrons.

25. The method of 21, wherein:
wherein said advertisement performance information comprises a number or frequency of performances of the advertising content.

26. The method of 21, wherein:
each entertainment device is configured to perform entertainment content in exchange for payment.

27. The method of 21, further comprising:
associating the user interaction information with time information regarding a time during which each user interaction occurred.

28. A system for processing data from a plurality of entertainment devices, comprising:
an entertainment device database including information regarding a plurality of entertainment devices configured to perform entertainment content upon request from users;
a storage system storing advertisement performance information received from the plurality of entertainment devices, the advertisement performance information including user interaction with advertising content on each of the plurality of entertainment devices; and
a processor configured to associate the advertisement performance information for one of the plurality of entertainment devices with venue information regarding a venue in which the one of the plurality of entertainment devices is located, wherein the advertisement performance information regarding user interaction with the advertising content is correlated with one or more characteristics of the venue in which the entertainment device is located, wherein the advertisement performance information regarding user interaction with the advertising content that is correlated with one or more characteristics of the venue in which the entertainment device is located is used at least in part for selecting a targeted advertisement for the entertainment device, wherein the selecting a targeted advertisement is further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
and wherein the model type of the entertainment device includes a freestanding entertainment device type, a wall-mounted entertainment device type, and a tabletop entertainment device type, and the historical performance related characteristic of the entertainment device includes a revenue-generating based ranking.

29. The system of 28, wherein:
wherein said venue information comprises a geographic location of the venue.

30. The system of 28, wherein:
wherein said venue information comprises a type of venue.

31. The system of 28, wherein:
wherein said venue information comprises a demographic profile of expected venue patrons.

32. The system of 28, wherein:
wherein said advertisement performance information comprises a number or frequency of advertisement performances.

33. The system of 28, wherein:
said plurality of entertainment devices are configured to perform entertainment content in exchange for payment.

34. The system of 28, wherein:
said processor is further configured to associate the user interaction information with time information regarding a time during which each user interaction occurred.

35. A method of processing data from a plurality of entertainment devices, comprising:
- receiving user interaction information, said user interaction information comprising information regarding user interaction with an advertisement displayed on an entertainment device, said entertainment device being configured to perform entertainment content;
- associating the user interaction information with venue information regarding a performance history of the entertainment device, wherein the information regarding user interaction with the advertisement displayed on the entertainment device is correlated with the performance history of the entertainment device; and
- displaying a targeted advertisement on the entertainment device, wherein the targeted advertisement is selected based at least in part on the information regarding user interaction with the advertisement displayed on the entertainment device that is correlated with the performance history of the entertainment device, wherein the targeted advertisement is selected further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
- and wherein the model type of the entertainment device includes a freestanding entertainment device type, a wall-mounted entertainment device type, and a tabletop entertainment device type, and the historical performance related characteristic of the entertainment device includes a revenue-generating based ranking.

36. The method of 35, wherein:
wherein said user interaction information comprises a number or frequency of user interactions with the advertisement.

37. The method of 35, wherein:
wherein said user interaction information comprises user-entered information.

38. The method of 37, wherein:
wherein said user-entered information comprises user selections in response to one or more queries.

39. The method of 37, wherein:
wherein said user-entered information comprises personal information regarding the user.

40. The method of 35, wherein:
said entertainment device is configured to perform entertainment content in exchange for payment.

41. The method of 35, further comprising:
associating the user interaction information with time information regarding a time during which each user interaction occurred.

42. A system for processing data from a plurality of entertainment devices, comprising:
- an entertainment device database including information regarding a plurality of entertainment devices configured to perform entertainment content;
- a storage system storing user interaction information received from the plurality of entertainment devices, said user interaction information comprising information regarding user interaction with an advertisement displayed on an entertainment device; and
- a processor configured to associate the user interaction information for one of the plurality of entertainment devices with venue information regarding a performance history of the one of the plurality of entertainment devices, wherein the information regarding user interaction with the advertisement displayed on the entertainment device is correlated with the performance history of the entertainment device, wherein the information regarding user interaction with the advertisement displayed on the entertainment device that is correlated with the performance history of the entertainment device is used at least in part for selecting a targeted advertisement for the entertainment device, wherein the selecting a targeted advertisement is further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network,
- and wherein the model type of the entertainment device includes a freestanding entertainment device type, a wall-mounted entertainment device type, and a tabletop entertainment device type, and the historical performance related characteristic of the entertainment device includes a revenue-generating based ranking.

43. The system of 42, wherein:
wherein said venue information comprises a geographic location of the venue.

44. The system of 42, wherein:
wherein said venue information comprises a type of venue.

45. The system of 42, wherein:
wherein said user interaction information comprises a number or frequency of user interaction with the advertisement.

46. The system of 42, wherein:
wherein said user interaction information comprises user-entered information.

47. The system of 46, wherein:
wherein said user-entered information comprises user selections in response to one or more queries.

48. The system of 46, wherein:
wherein said user-entered information comprises personal information regarding the user.

49. The system of 42, wherein:
said plurality of entertainment devices are configured to perform entertainment content in exchange for payment from users.

50. The system of 42, wherein:
said processor is further configured to associate the user interaction information with time information regarding a time during which each user interaction occurred.

51. A method of processing data from a plurality of entertainment devices, comprising:
- receiving advertisement performance information regarding user interaction with advertising content on each of the plurality of entertainment devices, each entertainment device being configured to perform entertainment content upon request from users; and
- associating the advertisement performance information with venue information regarding a performance history of the entertainment device, wherein the information regarding user interaction with the advertisement displayed on the entertainment device is correlated with the performance history of the entertainment device, wherein the information regarding user interaction with the advertisement displayed on the entertainment device that is correlated with the performance history of the entertainment device is used at least in part for selecting a targeted advertisement for the entertainment device, wherein the selecting a targeted advertisement is further based at least in part on a network-wide criteria and a device-specific criteria associated with the entertainment device, wherein the device-specific criteria includes a model type of the entertainment device, and wherein the network-wide criteria includes a historical performance related characteristic of the entertainment device relative to a plurality of other entertainment devices across an entertainment device network, and wherein the model type of the entertainment device includes a freestanding entertainment device type, a wall-mounted entertainment device type, and a tabletop entertainment device type, and the historical performance related characteristic of the entertainment device includes a revenue-generating based ranking.

52. The method of 51, wherein:

wherein said advertisement performance information comprises a number or frequency of performances of the advertising content.

53. The method of 51, wherein:

each entertainment device is configured to perform entertainment content in exchange for payment.

54. The method of 51, further comprising:

associating the user interaction information with time information regarding a time during which each user interaction occurred.

55. A system for processing data from a plurality of entertainment devices, comprising:

an entertainment device database including information regarding a plurality of entertainment devices configured to perform entertainment content upon request from users;

a storage system storing advertisement performance information received from the plurality of entertainment devices, the advertisement performance information including user interaction with advertising content on each of the plurality of entertainment devices; and a processor configured to associate the advertisement performance information for one of the plurality of entertainment devices with venue information regarding a performance history of the entertainment device, wherein the information regarding user interaction with the advertisement displayed on the one of the plurality of entertainment devices is correlated with the performance history of the one of the plurality of entertainment devices, wherein the information regarding user interaction with the advertisement displayed on the one of the plurality of entertainment devices that is correlated with the performance history of the one of the plurality of entertainment devices is used at least in part for selecting a targeted advertisement for the one of the plurality of entertainment devices, wherein the selecting a targeted advertisement for the one of the plurality of entertainment devices is further based at least in part on a network-wide criteria and a device-specific criteria associated with the one of the plurality of entertainment devices, wherein the device-specific criteria includes a model type of the entertainment device, and wherein the network-wide criteria includes a historical performance related characteristic of the entertainment device relative to a plurality of other entertainment devices across an entertainment device network, and wherein the model type of the entertainment device includes a freestanding entertainment device type, a wall-mounted entertainment device type, and a tabletop entertainment device type, and the historical performance related characteristic of the entertainment device includes a revenue-generating based ranking.

56. The system of 55, wherein:

wherein said advertisement performance information comprises a number or frequency of advertisement performances.

57. The system of 55, wherein:

said plurality of entertainment devices are configured to perform entertainment content in exchange for payment from users.

58. The system of 55, wherein:

said processor is further configured to associate the user interaction information with time information regarding a time during which each user interaction occurred.

\* \* \* \* \*